(12) United States Patent
Schmidt et al.

(10) Patent No.: US 9,497,785 B2
(45) Date of Patent: Nov. 15, 2016

(54) TECHNIQUES FOR EXCHANGING BEAMFORMING INFORMATION FOR A DUAL CONNECTION TO USER EQUIPMENT

(71) Applicant: INTEL IP CORPORATION, Santa Clara, CA (US)

(72) Inventors: Andreas Schmidt, Braunschweig (DE); Maik Bienas, Braunschweig (DE); Martin Hans, Braunschweig (DE); Michael Faerber, Wolfratshausen (DE)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/293,848

(22) Filed: Jun. 2, 2014

(65) Prior Publication Data

US 2015/0351135 A1    Dec. 3, 2015

(51) Int. Cl.
*H04W 76/02* (2009.01)
*H04W 16/28* (2009.01)
*H04W 52/38* (2009.01)

(52) U.S. Cl.
CPC ............. *H04W 76/02* (2013.01); *H04W 16/28* (2013.01); *H04W 52/38* (2013.01)

(58) Field of Classification Search
CPC .............................. H04W 76/02; H04W 16/28
USPC ......... 455/450, 500, 464, 509; 370/328, 329
See application file for complete search history.

(56) References Cited

U.S. PATENT DOCUMENTS

| | | | |
|---|---|---|---|
| 8,811,393 B2 * | 8/2014 | Reddy et al. ................. 370/389 |
| 9,055,499 B1 * | 6/2015 | Ray | |
| 2007/0268858 A1 * | 11/2007 | Soto .............................. 370/328 |
| 2010/0128677 A1 * | 5/2010 | Liu ................... H04W 36/0022 370/328 |
| 2012/0040629 A1 * | 2/2012 | Li .......................... H01Q 1/246 455/91 |
| 2013/0065622 A1 * | 3/2013 | Hwang ................. H04W 16/28 455/500 |
| 2013/0100819 A1 * | 4/2013 | Anchan et al. ............... 370/241 |
| 2013/0315325 A1 * | 11/2013 | Wang .................... H04B 7/043 375/267 |
| 2014/0071951 A1 * | 3/2014 | Liu et al. ...................... 370/332 |
| 2015/0049681 A1 * | 2/2015 | Huang ............. H04W 72/1289 370/329 |

* cited by examiner

Primary Examiner — Cong Tran

(57) ABSTRACT

Examples are disclosed for exchanging beamforming information for a first wireless link utilized as a first connection of a dual connection for user equipment (UE) to access a network. The beamforming information exchanged between the UE and a small cell base station (BS) to configure the first wireless link as a beam-formed wireless link. Other examples are described and claimed.

23 Claims, 16 Drawing Sheets

Beam Activation Request Message Format 400

| UE Identifier | Location Information | | | UE Capabilities | | |
|---|---|---|---|---|---|---|
| 410 | 420 | 430 | 440 | 450 | 460 | 470 |
| ID | Coordinates | Velocity | Error | # of Antennas | Initial Tx Power | Max. Tx Power |

*FIG. 4*

Beam Activation Response Message Format 500

| Grant | Small Cell BS Identifier | Location Information | | | Small Cell BS Capabilities | | |
|---|---|---|---|---|---|---|---|
| 505 | 510 | 522 | 524 | 526 | 532 | 534 | 536 |
| Y/N | ID | Coordinates | Velocity | Error | # of Antennas | Initial Tx Power | Max. Tx Power |

| Beam Identifier | Power Ramp Information | | Beam Configuration Data | | | | | | | | |
|---|---|---|---|---|---|---|---|---|---|---|---|
| | | | Sleep Mode Config. Information | | Active Mode Config Information | | | Resource Info. | | Code Sequence Info. | | |
| 540 | 552 | 554 | 562 | 564 | 566 | 572 | 574 | 576 | 582 | 584 | 592 | 594 | 596 |
| ID | Ramp Up | Ramp Down | Time | Pattern | Ref. | Time | Pattern | Ref. | UL Time | DL Time | Dir. | Angle | Sector |

RECEIVE A BEAM ACTIVATION REQUEST MESSAGE THAT INCLUDES INFORMATION TO INITIATE CONFIGURATION OF A FIRST WIRELESS LINK AS A BEAM-FORMED WIRELESS LINK BETWEEN AN UE AND A SMALL CELL BASE STATION
*1002*

TRANSMIT A BEAM ACTIVATION RESPONSE MESSAGE DESTINED FOR THE UE, THE BEAM ACTIVATION RESPONSE MESSAGE INCLUDING BEAMFORMING CONFIGURATION DATA FOR THE UE TO CONFIGURE TRANSCEIVER CIRCUITRY FOR THE BEAM-FORMED WIRELESS LINK WITH THE SMALL CELL BASE STATION
*1004*

EXCHANGE BEAM TRAINING INFORMATION BETWEEN THE UE AND THE SMALL CELL BASE STATION TO ESTABLISH THE BEAM-FORMED WIRELESS LINK AS A FIRST CONNECTION OF A DUAL CONNECTION THAT HAS A SECOND CONNECTION OVER A SECOND WIRELESS LINK WITH A MACRO CELL BASE STATION, THE UE CAPABLE OF ACCESSING A NETWORK VIA THE DUAL CONNECTION WITH THE MACRO CELL BASE STATION SERVING AS A PRIMARY CELL AND THE SMALL CELL BASE STATION SERVING AS A SECONDARY CELL
*1006*

*FIG. 10*

Storage Medium 1100

Computer Executable Instructions for 1000

TRANSMIT, AT AN UE, A BEAM ACTIVATION REQUEST MESSAGE TO A SMALL CELL BASE STATION OVER AN ESTABLISHED FIRST WIRELESS LINK WITH THE SMALL CELL BASE STATION, THE BEAM ACTIVATION REQUEST MESSAGE TO INITIATE A SECOND WIRELESS LINK WITH THE SMALL CELL BASE STATION
1302

RECEIVE A BEAM ACTIVATION RESPONSE MESSAGE OVER THE FIRST WIRELESS LINK THAT INCLUDES BEAM FORMING CONFIGURATION DATA TO ARRANGE TRANSCEIVER CIRCUITRY TO CONFIGURE THE SECOND WIRELESS LINK AS A BEAM-FORMED WIRELESS LINK
1304

EXCHANGE BEAM TRAINING INFORMATION BETWEEN THE UE AND THE SMALL CELL BASE STATION TO ESTABLISH THE BEAM-FORMED WIRELESS LINK AS A FIRST CONNECTION OF A DUAL CONNECTION THAT HAS A SECOND CONNECTION OVER A SECOND WIRELESS LINK WITH A MACRO CELL BASE STATION, THE UE CAPABLE OF ACCESSING A NETWORK VIA THE DUAL CONNECTION WITH THE MACRO CELL BASE STATION SERVING AS A PRIMARY CELL AND THE SMALL CELL BASE STATION SERVING AS A SECONDARY CELL
1306

PLACE TRANSCEIVER CIRCUITRY FOR THE FIRST WIRELESS LINK IN A LOW POWER MODE RESPONSIVE TO ESTABLISHMENT OF THE BEAM-FORMED WIRELESS LINK WITH THE SMALL CELL BASE STATION
1308

*FIG. 13*

Storage Medium 1400

Computer Executable Instructions for 1300

*FIG. 14*

TECHNIQUES FOR EXCHANGING BEAMFORMING INFORMATION FOR A DUAL CONNECTION TO USER EQUIPMENT

TECHNICAL FIELD

Examples described herein are generally related to wireless communication devices.

BACKGROUND

Small cells which may include, but are not limited to, picocells or femtocells may be deployed to serve user equipment (UEs) located within one or more larger macro cells in a wireless network. These small cells may be offered or provided by low power base stations deployed to cope with locations within the one or more macro cells that may have higher concentrations of UEs such as an office complex, collage campus, apartment complex, an urban core or a sports arena. Small cells may also be deployed to possibly boost data throughputs in locations that may experience weaker signals from a given macro cell base station due to distance and/or interference. A low power base station is typically configured to have a transmit power that is lower than a transmit power for the given macro cell base station.

BRIEF DESCRIPTION OF THE DRAWINGS

FIG. 4 illustrates an example of a first message format.
FIG. 5 illustrates an example of a second message format.
FIG. 10 illustrates an example of a first logic flow.
FIG. 11 illustrates an example of a first storage medium.
FIG. 13 illustrates an example of a second logic flow.
FIG. 14 illustrates an example of a second storage medium.

DETAILED DESCRIPTION

Figure 1:
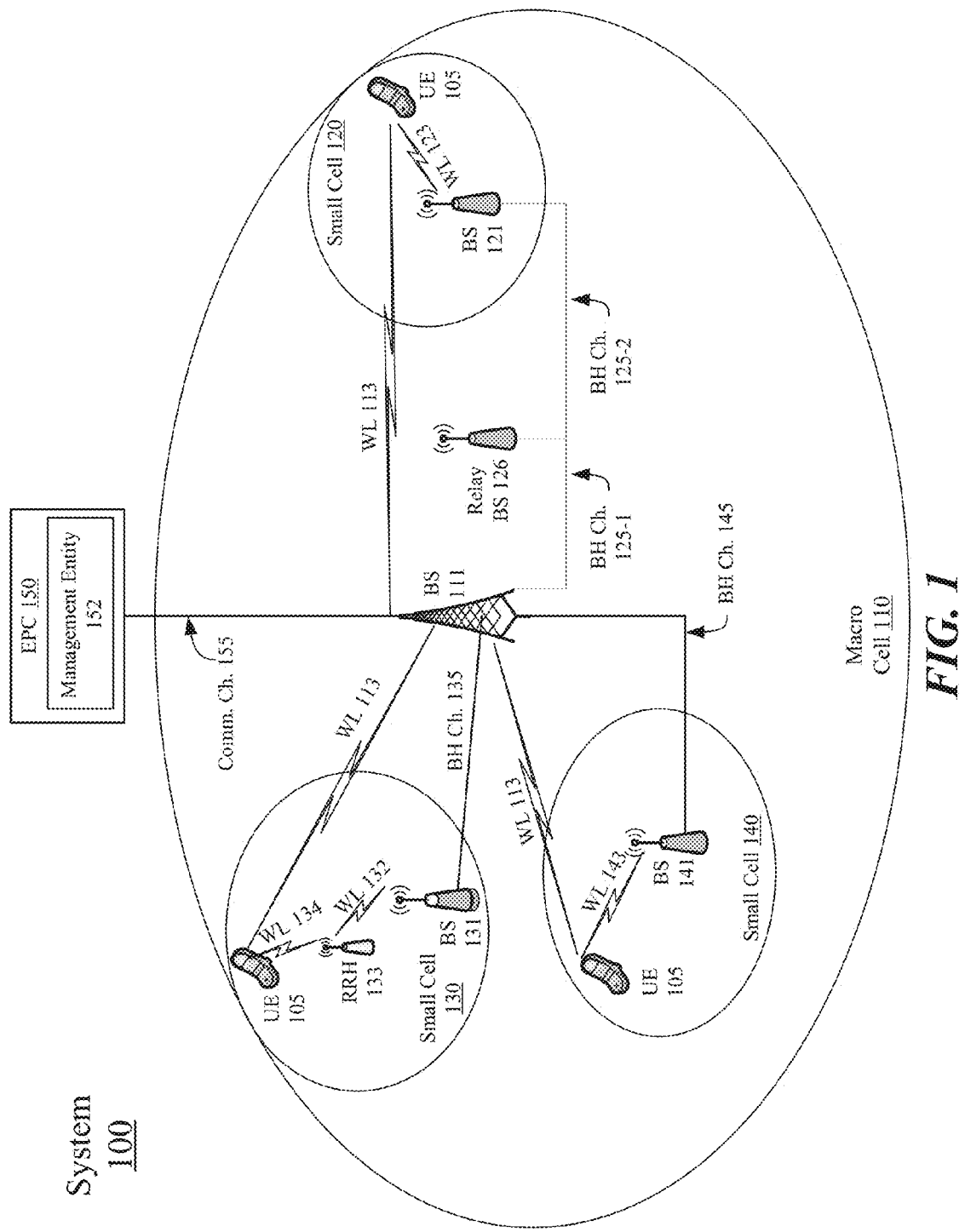
FIG. 1 illustrates an example of a first system.

Examples are generally directed to improvements for wireless wide area networks (WWANs) using wireless mobile telecommunication cellular or wireless mobile broadband technologies. Wireless mobile broadband technologies may include any wireless technologies suitable for use with wireless devices or user equipment (UE), such as one or more third generation (3G), fourth generation (4G) or emerging fifth generation (5G) wireless standards, revisions, progeny and variants. Examples of wireless mobile broadband technologies may include without limitation any of the Institute of Electrical and Electronics Engineers (IEEE) 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI), Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8, 9, 10 or 11 of LTE/System Architecture Evolution (SAE), and so forth. The examples are not limited in this context.

By way of example and not limitation, various examples may be described with specific reference to various 3GPP radio access network (RAN) standards, such as the 3GPP Universal Terrestrial Radio Access Network (UTRAN), the 3GPP Evolved Universal Terrestrial Radio Access Network (E-UTRAN) and 3GPP's suite of UMTS and LTE/LTE-Advanced Technical Specifications (in case of LTE/LTE-Advanced collectively "3GPP LTE Specifications" according to the 36 Series of Technical Specifications), and IEEE 802.16 standards, such as the IEEE 802.16-2009 standard and current third revision to IEEE 802.16 referred to as "802.16Rev3" consolidating standards 802.16-2009, 802.16h-2010 and 802.16m-2011, and the IEEE 802.16p draft standards including IEEE P802.16.1b/D2 January 2012 titled "Draft Amendment to IEEE Standard for Wireless-MAN-Advanced Air Interface for Broadband Wireless Access Systems, Enhancements to Support Machine-to-Machine Applications" (collectively "IEEE 802.16 Standards"), and any drafts, revisions or variants of the 3GPP LTE Specifications and the IEEE 802.16 Standards. Although some embodiments may be described as a 3GPP LTE Specifications or IEEE 802.16 Standards system by way of example and not limitation, it may be appreciated that other types of communications system may be implemented as various other types of mobile broadband communications systems and standards. The examples are not limited in this context.

As contemplated in the present disclosure, small cells may be deployed under macro cell coverage to provide an additional way or layer to serve UEs located within a macro cells. In other words, a small cell encompasses a smaller area compared to an area covered by a macro cell. Small cells may also be deployed at macro cell edges or, generally speaking, areas where macro cell coverage can be expected to be poor and/or in coverage holes of the macro cell. The macro cell may be provided by a base station arranged to operate as an evolved Node B (eNB) according to one or more 3GPP LTE Specifications including LTE-A ("macro cell eNB"). This type of node may also be referred to as an "anchor BS". Also, smalls cells may be provided by another, relatively low power base station also arranged to operate as an eNB according to one or more 3GPP LTE Specifications including LTE-A ("small cell eNB"). In some examples, a UE may be wirelessly connected to both a macro cell eNB and a small cell eNB concurrently via an LTE-A air or Uu interface (e.g., cellular wireless link). This concurrent connection may be called a dual connection or dual connectivity. Dual connectivity may be similar to inter-eNB carrier aggregation (CA). The examples, however, are not limited in this respect.

Small cell base stations and UEs may each have capabilities to establish beam-formed wireless links. In some examples, these beam-formed wireless links may be associated with extremely high frequency radio signals that may be referred to as millimeter wave (mmWave) wireless links. Some types of mmWave wireless links may allow for large bandwidth or data capacity for an mmWave wireless link possibly established between a given UE and small cell base station over a relatively short distance (e.g., a few hundred meters). This type of node may also be referred to as a "booster BS". Types of mmWave wireless links may be established and/or maintained through various frequency bands to include those associated with WiGig™ frequency bands, e.g., between 57-64 gigahertz (GHz) or those associated with other frequency bands such as between 20-30 GHz or even possibly between 20-75 GHz. The exact frequency range of the mmWave band may vary worldwide from one region to another. According to other examples, mmWave wireless links may be established and/or maintained in the unlicensed 60-GHz band (57-66 GHz) and in the light-licensed E band (71-76 GHz, 81-86 GHz). These types of mmWave wireless links may utilize technologies as described in various standards promulgated by IEEE or 3GPP. For example, wireless Ethernet wireless standards (including progenies and variants) associated with the IEEE Standard for Information technology—Telecommunications and information exchange between systems—Local and metropolitan area networks—Specific requirements Part 11: WLAN Media Access Controller (MAC) and Physical Layer (PHY) Specifications, published March 2012, and/or later versions of this standard ("IEEE 802.11"). One such standard related to WiGig and use of the 57-64 GHz frequency band is IEEE 802.11ad.

According to some examples, wireless links such as mmWave wireless links may enable a small cell base station to provide a potentially large bandwidth access link as a first wireless link for a dual connection for a UE to access a network while the UE also maintains a second wireless link of the dual connection with a macro cell base station. For these examples, the second wireless link may be through a cellular-based interface of the UE (e.g., LTE-A air or Uu interface) to maintain a cellular link that may route control-plane (c-plane) packets associated with accessing the network via the dual connection. Meanwhile, the large bandwidth mmWave wireless link may be utilized to route user-plane (u-plane) packets when the UE accesses the network via this first wireless link of the dual connection. Also, beamforming capabilities associated with implementing such standards as WiGig may allow the UE and the small cell base station to use less power and yet maintain a large bandwidth. Further, frequency bands in the mmWave range may have excellent spatial re-use properties that may allow a single small cell base station to service many UEs that may be closely located to one another.

In some examples, UEs that may implement dual connections may be mobile and establishing an mmWave wireless link that involves beamforming may be difficult and time consuming. The difficulty and time consumption may be due to either or both the UE and the small cell base station lacking means to determine locations and/or authenticate each other before initiating respective beamforming configurations to set-up or establish an mmWave wireless link. The difficulty and time may outweigh increased bandwidth and/or power savings associated with an established mmWave wireless link for use in a dual connection. It is with respect to these and other challenges that the examples described herein are needed.

In some examples, techniques are implemented for exchanging beamforming information for a dual connection to a UE. These techniques may include receiving a beam activation request message that includes information to initiate configuration of a first wireless link as a beam-formed wireless link between a UE and a small cell base station. The techniques may also include transmitting a beam activation response message destined for the UE. The beam activation response message may include beamforming configuration data for the UE to configure transceiver circuitry for the beam-formed wireless link with the small cell base station. The techniques may also include causing an exchange of beam training information between the UE and the small cell base station to establish the beam-formed wireless link as a first connection of a dual connection. The dual connection may have a second connection over a second wireless link (e.g., a cellular wireless link) with a macro cell base station. The UE may be capable of accessing a network via the dual connection with the macro cell base station serving as a primary cell and the small cell base station serving as a secondary cell.

FIG. 1 illustrates an example of a first system. In some examples, as shown in FIG. 1, the first system includes system 100. System 100 may be part of a wireless network operated according to one or more 3GPP Specifications including LTE-A. As shown in FIG. 1, system 100 includes macro cell 110 and small cells 120, 130 and 140. Also, as shown in FIG. 1, macro cell 110 and small cells 120, 130 and 140 may each include a base station (BS) 111, 121, 131 and 141, respectively. According to some examples, small cells 120, 130 or 140 may represent micro, pico, femto or small cells deployed under macro cell 110's coverage area. As described more below, UEs such as UE 105 may be capable of maintaining two separate (and, in some examples, concurrent) connections between macro cell BS 111 and one of BSs 121,131 or 141 to access a network. According to some examples, base station 111 may be capable of serving as an anchor BS and BSs 121, 131 and 141 may be capable of serving as separate booster BSs. The network, for example, may be managed by an evolved packet core (EPC) operated in compliance with one or more 3GPP Specifications including LTE-A that also include a management entity such as EPC 150 having a management entity 152 as shown in FIG. 1. For these examples, management entity 152 may include one or more management entities, such as a mobile management entity (MME) or a serving gateway (SGW).

According to some examples, a UE such as UE 105 may utilize a remote radio head (RRH) to couple to a small cell BS. For example, as shown in FIG. 1, UE 105 located in small cell 130 may need to utilize RRH 133 to provide a multi-hop wireless link to BS 131 that includes wireless links 132 and 134.

According to some examples, as shown in FIG. 1, BS 111 may be coupled or interconnected with BSs 121, 131 and 141 via separate backhaul (BH) channels. These BH channels are shown in FIG. 1 as BH channels 125-1/125-2, a BH channel 135 and a BH channel 145 coupled between BS 111 and BSs 121, 131, and 141, respectively. For these examples, BSs 111, 121, 131 and 141 may communicate through these backhaul channels through an X2 interface. These BH channels may be routed over wired or wireless communication mediums.

In some examples, a BH channel may include multiple hops between a macro cell BS and a small cell BS. For example, as shown in FIG. 1, a BH channel between BS 111 and BS 121 may utilize a relay BS 126 to provide a BH channel having hops that include BH channel 125-1 and 125-2. This disclosure is not limited to 2-hop BH channels. Any number of hops utilizing any number of relay BSs is contemplated for a multi-hop BH channel between a macro cell BS and a small cell BS. Although not shown in FIG. 1, a relay BS such as relay BS 126 may also serve as a small cell BS for one or more UEs and may establish beam-formed wireless links with these one or more UEs in a similar manner as described for BSs 121, 131 or 141.

According to some examples, as shown in FIG. 1, BS 111 may couple to EPC 150 through communication channel 155. For these examples, BSs 121, 131, or 141 may route communications to or from management entity 152 located at or with EPC 150 through BS 111 via use of the BH channels. In other examples, UE 105 may also utilize BS 111's connection to EPC 150 to route communication to or from management entity 152. As described more below, communications routed to or from management entity 152 may include beam activation request or response messages to initiate and/or establish a beam-formed wireless link between a UE such as UE 105 and a small cell BS such as BS 121, 131 or 141.

In some examples, a beam activation response message may be received (e.g., at a small cell BS such as BS 141) that includes information to initiate configuration of a first wireless link (e.g., WL 143) as a beam-formed (e.g., mmWave) wireless link between a UE (e.g., UE 105) and a small cell BS (e.g., BS 141). For these examples, a beam activation response message destined for the UE may be transmitted (e.g., by the small cell BS). The beam activation response message may include beamforming configuration data for the UE to configure transceiver circuitry for the beam-formed wireless link with the small cell BS. Beam training information may then be exchanged between the UE and the small cell BS to establish the beam-formed wireless link as a first connection of a dual connection that has a second connection over a second wireless link (e.g., WL 113) with a macro cell BS (e.g., BS 111). The UE may then be capable of accessing a network (e.g., managed by EPC 150) via the dual connection with the macro cell BS serving as a primary cell and the small cell BS serving as a secondary cell.

UE 105 is not restricted to always establishing and maintaining only two connections. Instead, the term "dual connectivity" may also describe a scenario with UE 105 capable of maintaining the second connection to the macro cell BS (e.g., BS 111 (offering the primary cell 110) and multiple other connections to various small cell BSs, such as small cell BS 131 offering another possible secondary cell 130. Consequently, there may be more than just one small cell BS offering or serving as a secondary cell.

In some examples, the various wireless links depicted in FIG. 1 between a UE such as UE 105 and small BSs may represent established beam-formed or mmWave wireless links serving as one of the two or more connections of a dual connection. For example, WL 123 may be an established beam-formed wireless link between UE 105 and BS 121. Also, WLs 132 and 134 may be part of a multi-hop beam-formed wireless link between UE 105 and BS 131 that utilizes RRH 133. As described more below, the UE may route beam activation request messages either through BS 111 via direct wireless links such as WL 113 between UE 105 and BS 111 or via other wireless links (not shown) that may couple directly to respective small cell BSs. These other wireless links, as described in more detail below, may be cellular type wireless links (e.g., routed through an LTE-A air or Uu interface for the UE). The cellular type wireless links may be able to route control plane (c-plane) type data to enable the UE and the small cell BS to exchange beam activation request and response messages that may include information to initiate configuration of a beam-formed wireless link. The beam-formed wireless link, for example, may be configured to transmit or receive signals in a 57-64 GHz or 20-30 GHz radio frequency band.

According to some other examples, cellular type wireless links may be maintained between the UE and the macro cell BS and the UE may route a beam activation request message through the macro cell BS. For these other examples, the macro cell BS may then utilize a BH channel with the small cell BS to forward the beam activation request message to the small cell BS and then receive a beam activation response message from the small cell BS over the BH channel and then forward the beam activation response message to the UE over the cellular type wireless link. Alternatively, a management entity may originate the beam activation request message and have the macro cell BS forward the beam activation request message to the small cell BS over the BH channel with the small cell BS. The macro cell BS may then forward the beam activation response message to the UE over the cellular type wireless link that may include information to initiate configuration of a beam-formed wireless link. In some examples, the beam activation response message may be forwarded either directly after the macro cell BS receives or after first forwarding to the management entity and then receiving back from the management entity. The macro cell BS may first forward to the management entity to ensure the UE and/or small cell BS each have the proper credentials or capabilities to support a dual connection.

According to some examples, UE 105 may be any electronic device having wireless capabilities or equipment. For some examples, UE 105 may be implemented in a fixed or mobile device. A fixed device generally refers to an electronic device designed to be in a fixed, stationary, permanent or otherwise non-moving position or location that does not vary over time. For instance, a fixed device may be installed with fixtures, attachments and housings to prohibit movement, including wired power lines, transmission lines, and so forth. By way of contrast, a mobile device is designed to be portable enough to be frequently moved between various locations over time. It may be appreciated that although a fixed device is generally stationary, some fixed devices may be disconnected from their current equipment in a first fixed location, moved to a second fixed location, and connected to equipment at the second fixed location.

Figure 2A:
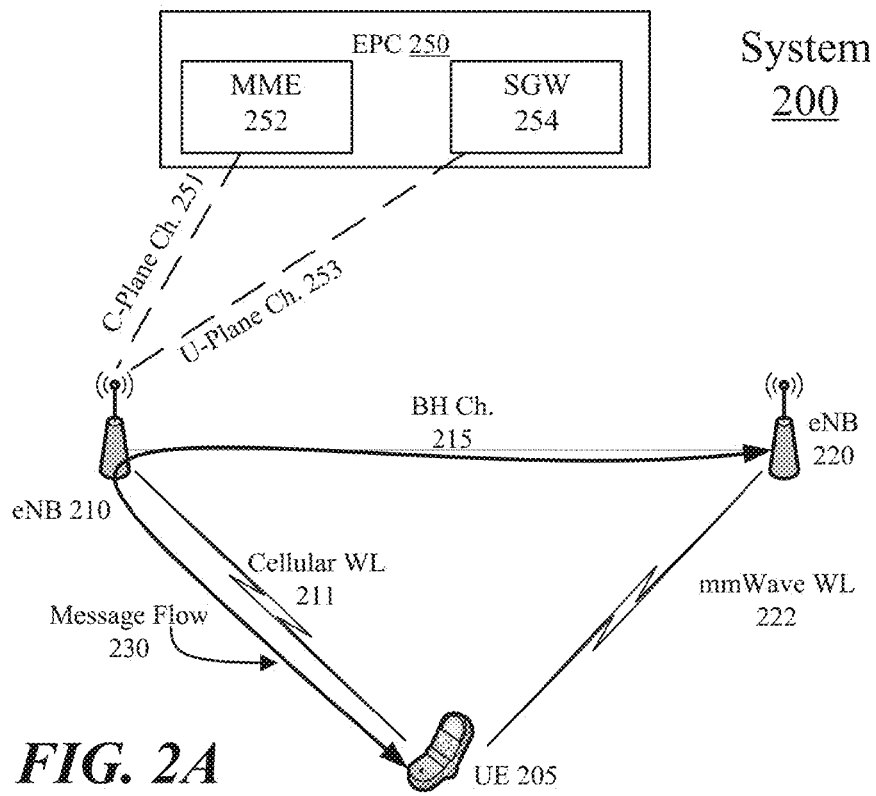
FIGS. 2A-B illustrate examples of a second system.
Figure 2B:
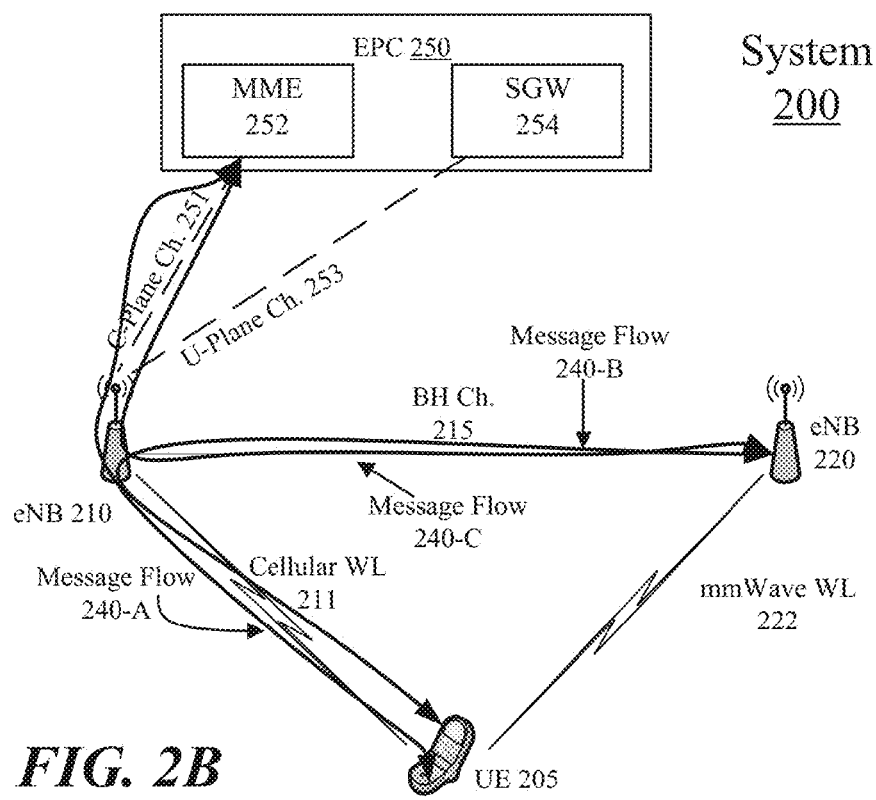

FIGS. 2A-B illustrate an example of a second system. In some examples, as shown in FIGS. 2A-B, the second system includes system 200. System 200 may be part of a wireless network operated according to one or more 3GPP Specifications including LTE-A. As shown in FIGS. 2A-B, system 200 includes a UE 205, eNBs 210, 220 or an EPC 250. According to some examples, as shown in FIG. 2, MME 252 and SGW 254 may be located or associated with EPC 250 for accessing and/or managing the LTE-compliant wireless network. For these examples, eNBs 210 and 220 may be part of an evolved universal terrestrial radio access network (E-UTRAN) for the LTE-compliant wireless network.

According to some examples, eNB 210 may be capable of serving as a macro cell BS and eNB 220 may be capable of serving as a small cell BS. According to some examples, eNB 210 may be capable of serving as an anchor BS and eNB 220 may be capable of serving as a booster BS. For these examples, as shown in FIGS. 2A-B, eNB 210 and eNB 220 may be coupled or interconnected via a BH channel 215. In some examples, eNBs 210 and 220 may include logic and/or features capable of communicating over BH channel 215 through an X2 interface.

In some examples, as shown in FIGS. 2A-B, eNB 210 may be coupled with MME 252 through control plane (c-plane) channel 251. For these examples, eNB 210 may include logic and/or features capable of communicating through c-plane channels 251 via an S1-MME interface. In some examples, c-plane channel 251 may include wired and/or wireless communication mediums configured to enable eNB 210 to communicate with MME 252 through the S1-MME interface.

According to some examples, as shown in FIGS. 2A-B, eNB 210 may be coupled with SGW 254 through user plane (u-plane) channel 253. For these examples, eNB 210 may include logic and/or features capable of communicating through u-plane channels 253 through an S1-U interface. In some examples, u-plane channel 253 may include wired and/or wireless communication mediums configured to enable eNB 210 to communicate with SWG 254 through the S1-U interface. For these examples, data traffic (e.g., excluding c-plane data traffic) originating from UE 205 may be routed over a beam-formed wireless link established between eNB 220 (e.g., mmWave WL 222). Data traffic originating from UE 205 may then be routed over BH channel 215 to eNB 210 and then over u-plane channel 253 to SGW 254 through eNB 210's S1-U interface.

In some examples, UE 205 may include logic and/or features to communicate with eNBs through an LTE-A air or LTE Uu interface (not shown). For example, UE 205 may communicate over cellular WL 211 with eNB 210 through an LTE-A air or Uu interface. In some examples, eNB 210 may be a macro cell BS capable of providing a primary cell and eNB 220 may be small cell BS capable of providing a secondary cell for dual connection for UE 205 to access the LTE-A compliant network managed by EPC 250. According to some examples, eNB 210 may be capable of serving as an anchor BS and eNB 220 may be capable of serving as a booster BS. As shown in FIGS. 2A-B, mmWave WL 222 may serve as a first connection of the dual connection while cellular WL 211 serves as the second connection.

According to some examples, as shown in FIG. 2A, a message flow 230 between UE 205 and eNB 220 may be routed over cellular WL 211 through eNB 210 and over BH channel 215. Message flow 230, for example, may illustrate the flow of information between UE 205 and eNB 220 to at least initiate configuration of mmWave WL 222. In some examples, mmWave WL 222 may be configured to transmit or receive signals in a 57-64 GHz or 20-30 GHz radio frequency band. For these examples, UE 205 may be an originator of a beam activation request message and may transmit the beam activation request message over cellular WL 211 to eNB 210. Also for these examples, eNB 210 may then forward the beam activation request message over BH channel 215 to eNB 220. A beam activation response message may then be transmitted by eNB 220 over BH channel 215 to eNB 210. The beam activation response message may then be forwarded by eNB 210 over cellular WL 211 to UE 205. The beam activation response message may include beamforming configuration data for a UE such as UE 205 to configure transceiver circuitry (not shown) for initiating establishment of mmWave WL 222. Once the transceiver circuitry is configured, then UE 205 and eNB 220 may exchange beam training information to complete the establishment of mmWave WL 222.

In some examples, as shown in FIG. 2B, a message flow 240 that includes message flows 240-A, 240-B and 240-C may represent various message flows involving a management entity at EPC 250 such as MME 252. For these examples, the various message flows may at least initiate configuration of mmWave WL 222.

According to some examples, UE 205 may be the originator of a beam activation request message destined for eNB 220. For these examples, the beam activation request message may be initially routed to MME 252 via message flow 240-A. MME 252 may then authenticate UE 205 and then forward the original beam activation request message and/or modify the beam activation request message before forwarding to eNB 220 via message flow 240-B. In some examples, eNB 220 may route a beam activation response message to UE 205 via message flow 240-C. In other examples, the beam activation response message may first be routed to MME 252 via message flow 240-B to ensure UE 205 and/or eNB 220 each have the proper credentials or capabilities to support a dual connection or mmWave/beam-formed wireless link. MME 252 may then forward the beam activation response message to UE 205 via message flow 240-A after authenticating UE 205 and/or eNB 220. As mentioned above, the beam activation response message may include beamforming configuration data for UE 205 to configure transceiver circuitry for initiating establishment of mmWave WL 222. Also, once the transceiver circuitry is configured, then UE 205 and eNB 220 may exchange beam training information to complete the establishment of mmWave WL 222.

In some examples, MME 252 may be the originator of a beam activation request message. For these examples, the beam activation request message may be sent to eNB 220 via message flow 240-B. A beam activation response message may then either be routed back to MME 252 via message flow 240-B or sent to UE 205 via message flow 240-C. As mentioned above, the beam activation response message may be sent to MME 252 first to ensure UE 205 and/or eNB 220 each have the proper credentials or capabilities to support a dual connection or mmWave/beam-formed wireless link. The beam activation response message may not be sent to MME 252 if these credentials or capabilities have already been verified. For this case, the beam activation response message may be sent to UE 205 via message flow 240-C without first going to MME 252.

Figure 3:
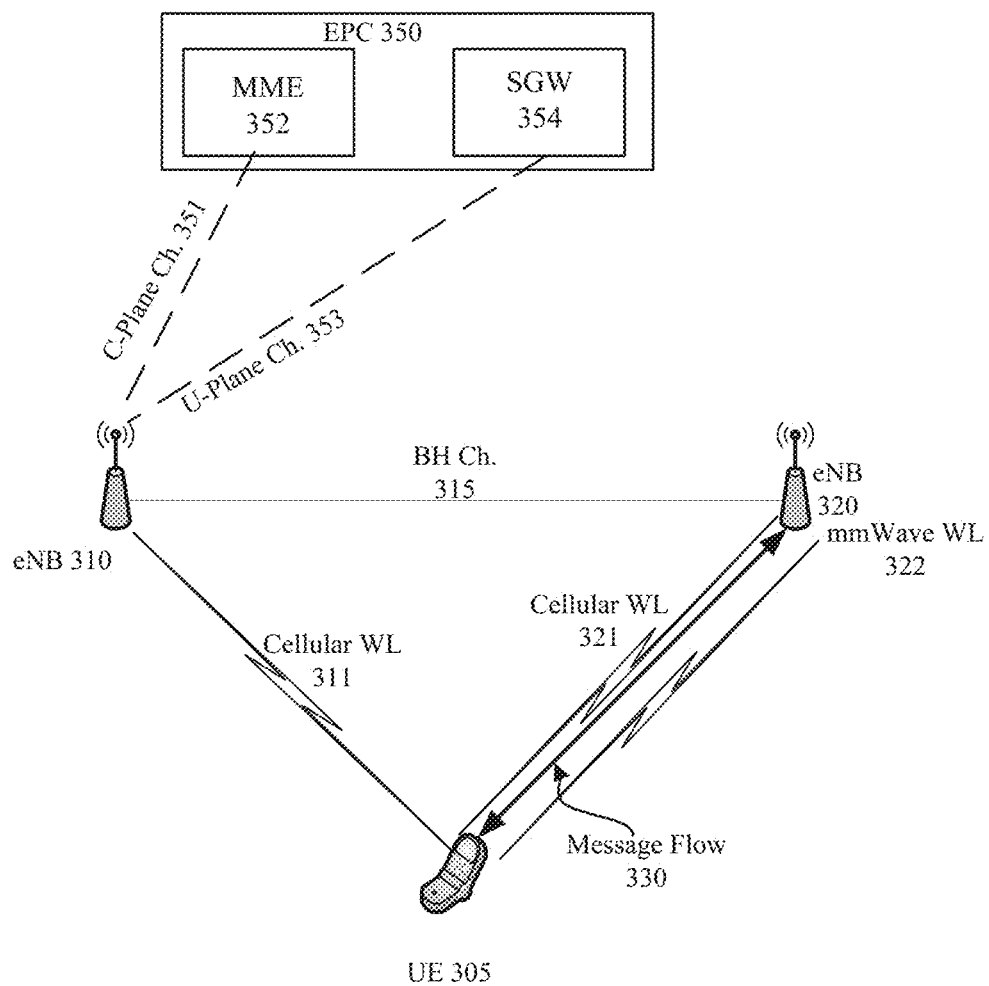
FIG. 3 illustrates an example of a third system.

FIG. 3 illustrates an example of a third system. In some examples, as shown in FIG. 3, the second system includes system 300. System 300 may be similar to system 200 shown in FIG. 2 and thus may be part of wireless network operated according to one or more 3GPP Specifications including LTE-A. For these examples, eNB 310 may be capable of serving as a macro cell BS and may be coupled to management entities included in an EPC 350 such as MME 352 over c-plane channel 351 or SGW 354 over u-plane channel 353. Logic and/or features of eNB 310 may be capable of communicating to MME 352 or SGW 354 through respective S1-MME or S1-U interfaces. Also, for these examples, eNB 320 may be capable of serving as a small cell BS and may couple to eNB 310 via BH channel 315. In some examples, eNBs 310 and 320 may include logic and/or features capable of communicating over BH channel 315 through an X2 interface. In some examples, eNB 310 may be a macro cell BS capable of providing a primary cell and eNB 320 may be small cell BS capable of providing a secondary cell for dual connection for UE 305 to access the LTE-A compliant network managed by elements of EPC 350. According to some examples, eNB 310 may be capable of serving as an anchor BS and eNB 320 may be capable of serving as a booster BS.

According to some examples, rather than routing message flows through a macro cell BS as shown in FIGS. 2A-B, system 300 in FIG. 3 illustrates a message flow 330 being routed over a cellular wireless link such as cellular WL 321 directly to a small cell BS such as eNB 320. For these examples, UE 305 may include logic and/or features to communicate with eNBs such as eNB 310 or eNB 320 through an LTE-A air or LTE Uu interface (not shown). Message flow 330 routed over cellular WL 321 may be used for UE 305 and eNB 320 to exchange beam activation request/response messages to at least initiate configuration of mmWave WL 322. In some examples, mmWave WL 322 may be configured to transmit or receive signals in a 57-64 GHz or 20-30 GHz radio frequency band.

In some examples, UE 305 may be an originator of a beam activation request message and may transmit the beam activation request message over cellular WL 321 to eNB 320. For these examples, eNB 320 may then transmit a beam activation response message to UE 305 over cellular WL 321. The beam activation response message may include beamforming configuration data for a UE such as UE 305 to configure transceiver circuitry (not shown) for initiating establishment of mmWave WL 322. Once the transceiver circuitry is configured, then UE 305 and eNB 320 may exchange beam training information to complete the establishment of mmWave WL 322.

FIG. 4 illustrates an example first message format. According to some examples, as shown in FIG. 4, the first message format includes beam activation request message format 400. Beam activation request message format 400 may be an example format for a beam activation request message to initiate configuration of a wireless link as a beam-formed or mmWave wireless link as mentioned above for systems 100-300 in FIGS. 1-3. This disclosure is not limited to the fields for a beam activation request message in the example format depicted in FIG. 4 or to examples mentioned above for system 100-300 in FIGS. 1-3.

According to some examples, as shown in FIG. 4, beam activation request message format 400 includes UE identifier information for a UE associated with the request in field 410, location information for the UE in fields 420-440 and UE capabilities in fields 450. For these examples, field 410 may include a unique identifier for the UE. Also, in regards to location information, field 420 may include coordinates to indicate a physical location of the UE, 430 may include velocity information to indicate an estimated velocity of the UE or field 440 may indicate reasons for possible lack of coordinates or velocity estimates for the UE. Also, in regards to UE capabilities, field 450 may indicate the number of antennas the UE may be using to support an mmWave or beam-formed wireless link, field 460 may indicate initial transmit (Tx) power and field 470 may indicate maximum Tx power (e.g., in decibels (dBm)).

FIG. 5 illustrates an example second message format. According to some examples, as shown in FIG. 5, the second message format includes beam activation response message format 500. Beam activation response message format 500 may be an example format for a beam activation response message that may include a grant indication and beam forming configuration data for a UE to configure transceiver circuitry for a wireless link to be configured as a beam-formed or mmWave wireless link as mentioned above for systems 100-300 in FIGS. 1-3. This disclosure is not limited to the fields for a beam activation response message in the example format depicted in FIG. 5 or to examples mentioned above for system 100-300 in FIGS. 1-3.

According to some examples, as shown in FIG. 5, beam activation response message format 500 includes a grant indication in field 505, small cell identifier information for a small cell BS associated with the response in field 510, location information for the small cell BS in fields 522, 524, 526 and small cell BS capabilities in fields 532, 534 and 536. For these examples, field 505 may indicate whether a grant to a request has been granted and field 510 may include a unique identifier for the small cell BS for which the request was granted. Also, in regards to location information, field 522 may include coordinates to indicate a physical location of the small cell BS, 524 may include velocity information to indicate an estimated velocity of the small cell BS (usually 0) or field 526 may indicate reasons for possible lack of coordinates or velocity estimates for the small cell BS. Also, in regards to small cell BS capabilities, field 532 may indicate the number of antennas the small cell BS may be using to support a given mmWave or beam-formed wireless link, field 534 may indicate initial transmit (Tx) power and field 536 may indicate maximum Tx power (e.g., in dBm).

In some examples, as shown in FIG. 5, beam activation response message format 500 also includes several fields having beam configuration data. For example, field 540 may include beam identifier information, fields 552 and 554 may include power ramp information, fields 562, 564 and 566 may include sleep mode configuration information, fields 572, 574 and 576 may include active mode configuration information, fields 582 and 584 may include resource information and fields 592, 594 and 596 may include code sequence information.

According to some examples, beam identifier information in field 540 may indicate a unique identifier for a beam to be configured to establish a beam-formed wireless link. Power ramp information in field 552 may indicate whether a power ramp-up is to be applied when configuring the beam and field 554 may indicate whether a power ramp-down is to be applied when configuring the beam. In one embodiment (a reference to) an algorithm to be used for performing power ramp-up/ramp-down may also be signaled in the Beam Activation Response Message (this is not shown in the example message format of FIG. 5 for sake of simplicity). Sleep mode configuration information in field 562 may indicate a wake-up time or times associated with maintaining the beam while in a sleep mode, information in field 564 may indicate wake-up patterns and information in field 566 include a reference to an algorithm to calculate or determine wake-up occasions or times. Active mode configuration information in field 572 may indicate idle time or times associated with maintaining the beam while in an active mode, information in field 574 may indicate idle patterns and information in field 576 include a reference to an algorithm to calculate or determine idle times. Resource information in field 582 may indicate an uplink (UL) time for resources allocated to support the beam for UL. Resource information in field 584 may indicate a downlink (DL) time for resources allocated to support the beam for DL. Code sequence information, for example, may be for one or more spread spectrum techniques and may include a field 592 to indicate a direction, a field 594 to indicate an angle and a filed 596 to indicate a sector for each of the one or more spread spectrum techniques. In some examples, an even finer granularity may be implemented: The "Code Sequence Info" may enable indication of different spreading sequences (i.e. codes) for different directions, angles or sectors.

Figure 6:
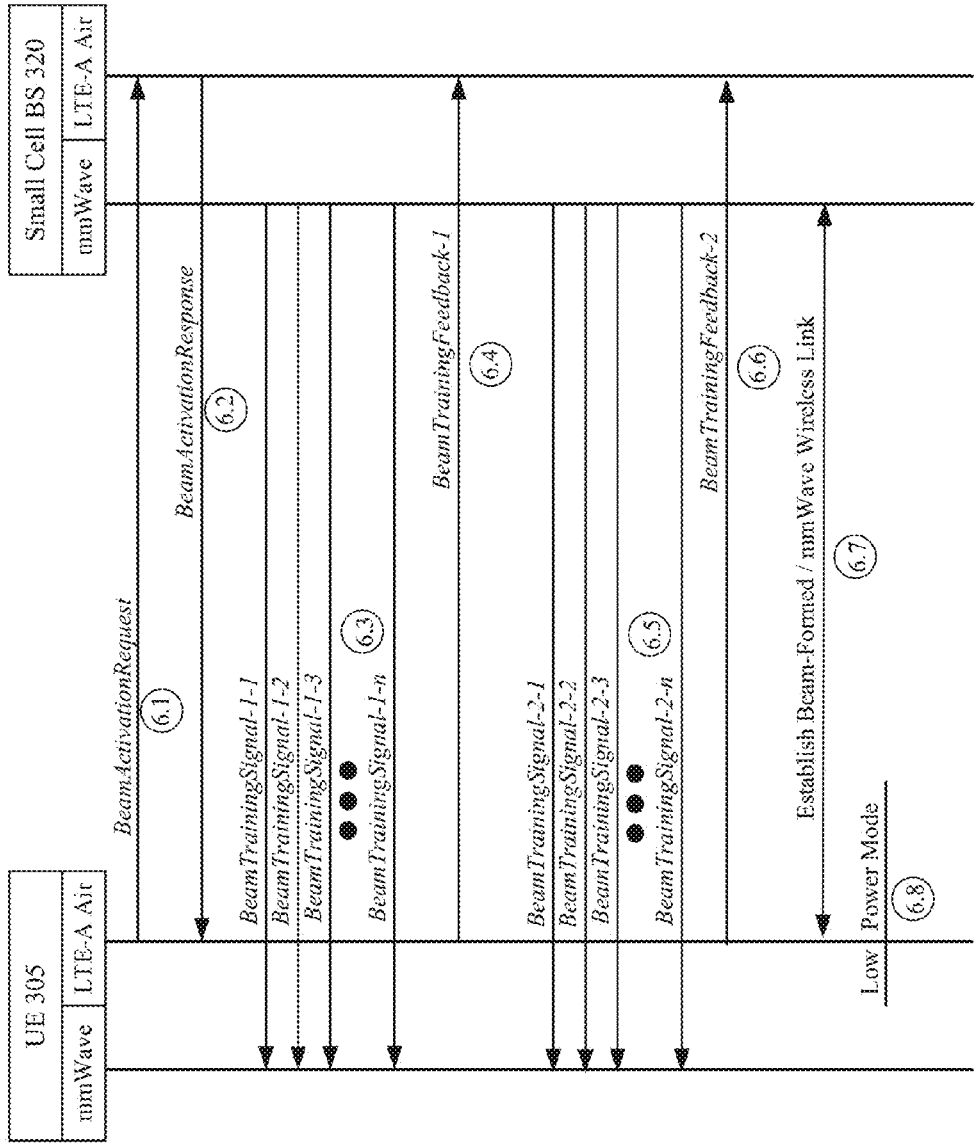
FIG. 6 illustrates an example first process.

FIG. 6 illustrates an example first process. In some examples, as shown in FIG. 6, the first process includes process 600. Process 600 may be for initiating and then establishing a beam-formed or mmWave wireless link between a UE and a small cell BS (or booster base station). For these examples, elements of system 300 as shown in FIG. 3 may be used to illustrate example operations related to process 600. Also, information included in beam activation request or response messages as described for beam activation request or response message formats shown in FIGS. 4 and 5 may be exchanged between these elements. However, the example process 600 is not limited to implementations using elements of system 300 or to example message formats shown in FIGS. 4 and 5.

Beginning at process 6.1 (BeamActivationRequest), logic and/or features at UE 305 may generate a beam activation request message in the example format of beam activation request message format 400. For these examples, the beam activation request message may include device or UE detection information for small cell BS 320 to identify and locate UE 305 such as an identifier, location information and capability information. In some examples, the beam activation request message may be to initiate configuration of a first wireless link as a beam-formed or mmWave wireless link (e.g., mmWave WL 322) configured to transmit or receive signals in a 57-64 GHz or 20-30 GHz radio frequency band. Also, for these examples, the beam activation request message may be transmitted through an LTE-A air or Uu interface and over a second wireless link that may be configured as an LTE-A compliant cellular wireless link such as cellular WL 321 to small cell BS 320.

Moving to process 6.2 (BeamActivationResponse), logic and/or features at small cell BS 320 may generate a beam activation response message responsive to receiving the beam activation request message from UE 305 through its LTE-A air or Uu interface. For these examples, the beam activation response message may be in the example format of beam activation response message format 500. If the request in not granted, only a grant indication that it was not granted may be included in field 505 of the beam activation response message. Otherwise, if granted, the beam activation response message may indicate the grant, may include small cell BS detection data for small cell BS 320 and beam configuration data. The small cell BS detection data may include location information, an identifier and small cell transmission capabilities for small cell BS 320. The beam configuration data may include a beam identifier, power ramp information, sleep and active mode configurations, beam resource information or code sequence information. Those pieces of information that are related to resource assignment for the beam may be indicated per direction, angle, and/or sector (as explained in context with FIG. 5). Also, for these examples, the beam activation response message may be transmitted through the LTE-A air or Uu interface at small cell BS 320 and over cellular WL 321 to UE 305.

Moving to process 6.3 (BeamTrainingSignal-1-1 to BeamTrainingSignal-1-n), logic and/or features at small cell BS 320 may transmit a first set of beam training signals illustrated in FIG. 6 as BeamTrainingSignal-1-1 to BeamTrainingSignal-1-n, where "n" is any positive integer greater than 2. For these examples, the first set of beam training signals may be sent through an mmWave interface (e.g., configured as a WiGig interface) and over the first wireless link to be configured as mmWave WL 322. The first set of beam training signals may be transmitted based on at least some of the information included in the beam activation request message received from UE 305. The first set of beam training signals may include beam adjustment data. The beam adjustment data may include a beam identifier and information regarding modified beam directions (e.g., horizontal and vertical).

Moving to process 6.4 (BeamTrainingFeedback-1), logic and/or features at UE 305 may send beam training feedback back to small cell BS 320 responsive to receiving the first set of beam training signals through its mmWave interface (e.g., configured as a WiGig interface). In some examples, the logic and/or features at UE 305 may select a signal (from the first set of beam training signals received in the previous step) having the best reception quality (e.g., with the highest received signal power) and indicate that selection in the beam training feedback. As shown in FIG. 6, in some examples, the beam training feedback may be transmitted through UE 305's LTE-A air or Uu interface and over cellular WL 321 to small cell BS 320.

Moving to process 6.5 (BeamTrainingSignal-2-1 to BeamTrainingSignal-2-n), logic and/or features at small cell BS 320 may then derive, based on received beam training feedback, a first estimation about optimal beam characteristics (e.g., beam direction) and then generate a second set of beam training signals. As illustrated in FIG. 6, the second set of beam training signals may include BeamTrainingSignal-2-1 to BeamTrainingSignal-2-n that may be transmitted based on this first estimation. According to some examples, an objective for this second set of training signals is to attempt to narrow down a lobe of the beam-formed first wireless link to "hit" UE 305 as precisely as possible, even if UE 305 is moving. For these examples, the second set of beam training signals may be transmitted over the first wireless link and through the mmWave interface.

Moving to process 6.6 (BeamTrainingFeedback-2), logic and/or features at UE 305 may send beam training feedback back to small cell BS 320 responsive to receiving the second set of beam training signals. In some examples, the logic and/or features at UE 305 may repeat the actions described above for process 6.5.

Moving to process 6.7 (Establish Beam-Formed/mm-Wave Wireless Link), logic and/or features at both UE 305 and small cell BS 320 may complete configuration of the first wireless link as a beam-formed or mmWave wireless link such as mmWave WL 322. In some examples, once established, mmWave WL 322 may be a first connection of a dual connection that has a second connection over a third wireless link with a macro cell BS such as macro cell BS 310. The third wireless link, for example, may be cellular WL 311. UE 305 may then be capable of accessing a network managed by EPC 350 via the dual connection with macro cell BS 310 serving as a primary cell and the small cell BS 320 serving as a secondary cell. According to some examples, macro cell BS 310 may be capable of serving as an anchor BS and small cell BS 320 may be capable of serving as a booster BS.

Moving to process 6.8 (Low Power Mode), logic and/or features at UE 305 may no longer need to maintain cellular WL 321 with small cell BS 320 in an active power mode. In some examples, the logic and/or features at UE 305 may power down transceiver circuitry and/or the LTE-A air or Uu interface to a low power mode such as a discontinuous reception (DRX) mode. For these examples, if readjustments are needed to mmWave WL 322 due to a possible degradation in the established beam, the logic and/or features at UE 305 may exit DRX mode and exchange beam adjustment information in a similar manner as described above at processes 6.3 to 6.7 to reestablish mmWave WL 322. Process 600 may then come to an end if no further adjustments are needed.

Figure 7:
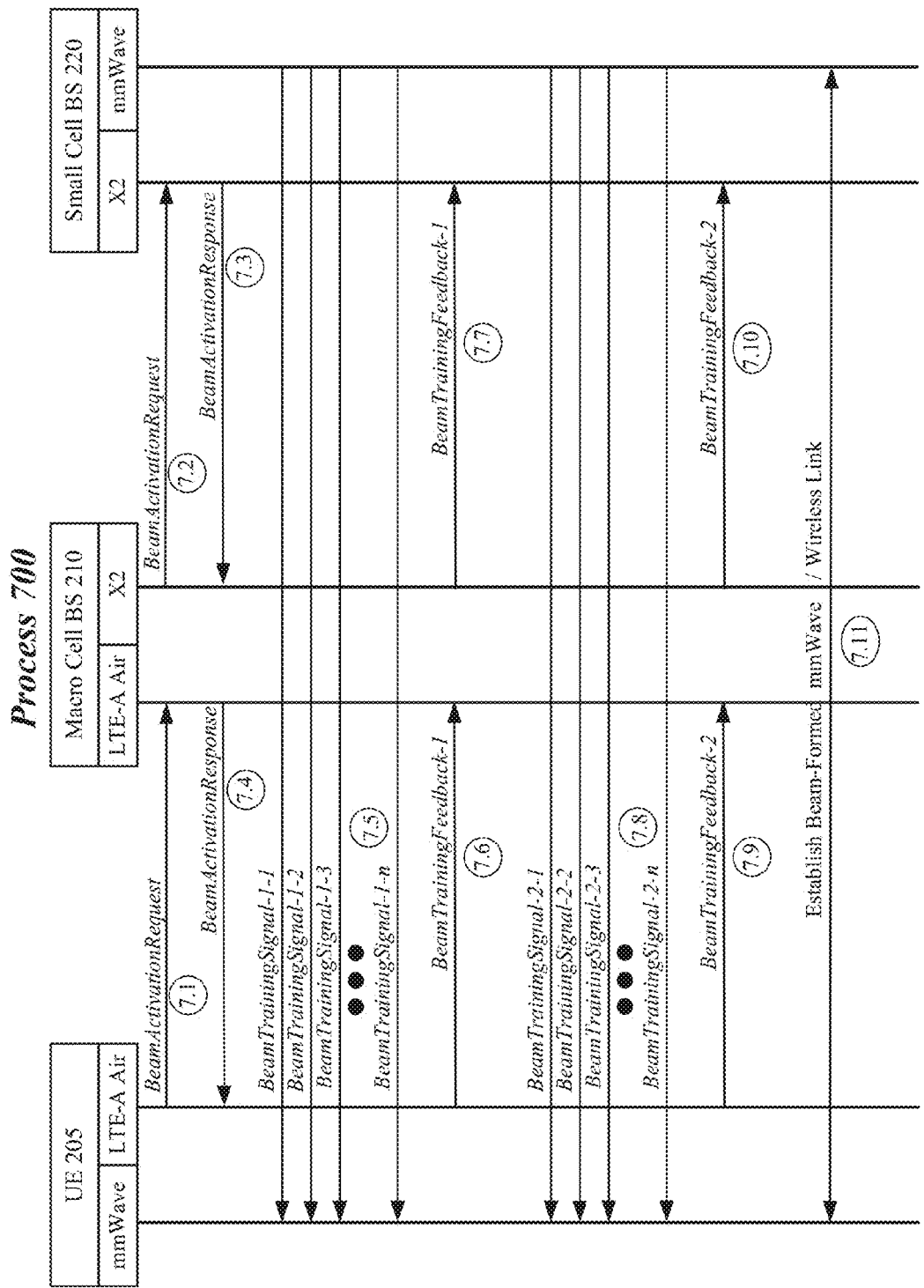
FIG. 7 illustrates an example second process.

FIG. 7 illustrates an example second process. In some examples, as shown in FIG. 7, the second process includes process 700. Process 700 may be for initiating and then establishing a beam-formed or mmWave wireless link between a UE and a small cell BS. For these examples, elements of system 200 as shown in FIG. 2A may be used to illustrate example operations related to process 700. Also, information included in beam activation request or response messages as described for beam activation request or response message formats shown in FIGS. 4 and 5 may be exchanged between these elements. However, the example process 700 is not limited to implementations using elements of system 200 or to example message formats shown in FIGS. 4 and 5.

Beginning at process 7.1 (BeamActivationRequest), logic and/or features at UE 205 may generate a beam activation request message in the example format of beam activation request message format 400. For these examples, the beam activation request message may include device or UE detection information for small cell BS (e.g., small cell BS 220) to identify and locate UE 205, location information and capability information. In some examples, the beam activation request message may be to initiate configuration of a first wireless link as a beam-formed or mmWave wireless link (e.g., mmWave WL 222) configured to transmit or receive signals in a 57-64 GHz or 20-30 GHz radio frequency band. Also, for these examples, the beam activation request message may be transmitted through an LTE-A air or Uu interface and over a second wireless link with a macro cell BS such as macro cell BS 210 that may be configured as an LTE-A compliant cellular wireless link such as cellular WL 211.

Moving to process 7.2 (BeamActivationRequest), logic and/or features at macro cell BS 210 may be capable of forwarding the beam activation request message to small cell BS 220. In some examples, the logic and/or features at macro cell BS 210 may be capable of forwarding the activation request message through an X2 interface and over a BH channel coupled to small cell BS 220 such as BH channel 215.

Moving to process 7.3 (BeamActivationResponse), logic and/or features at small cell BS 220 may generate a beam activation response message responsive to the beam activation request message that originated from UE 205, was forwarded over BH channel 215 and received through an X2 interface at small cell BS 220. For these examples, the beam activation response message may be in the example format of beam activation response message format 500. If the request is not granted, only a grant indication that the request was not granted may be included in field 505 of the beam activation response message. Otherwise, if granted, the beam activation response message may indicate the grant, may include small cell BS detection data for small cell BS 220 and beam configuration data. The small cell BS detection data may include location information, an identifier and small cell transmission capabilities for small cell BS 220. The beam configuration data may include a beam identifier, power ramp information, sleep and active mode configurations, beam resource information or code sequence information. Also, for these examples, the beam activation response message may be transmitted through the X2 interface at small cell BS 220 and over BH channel 215 to macro cell BS 210.

Moving to process 7.4 (BeamActivationResponse), logic and/or features at macro cell BS 210 may be capable of forwarding the beam activation response message to UE 205. In some examples, the logic and/or features at macro cell BS 210 may be capable of forwarding the activation request message through an LTE-A Air or Uu interface and over cellular WL 211 coupled to UE 205. UE 205 may then configure its transceiver circuitry to prepare for reception of beam training signals from small BS 220 through its mmWave interface (e.g., configured as a WiGig interface).

Moving to process 7.5 (BeamTrainingSignal-1-1 to BeamTrainingSignal-1-n), logic and/or features at small cell BS 220 may transmit a first set of beam training signals illustrated in FIG. 7 as BeamTrainingSignal-1-1 to BeamTrainingSignal-1-n. For these examples, the first set of beam training signals may be sent through an mmWave interface (e.g., configured as a WiGig interface) and over the first wireless link to be configured as mmWave WL 222. The first set of beam training signals may be transmitted based on at least some of the information included in the beam activation request message that originated from UE 205. The first set of beam training signals may include beam adjustment data. The beam adjustment data may include a beam identifier and information regarding modified beam directions (e.g., horizontal and vertical).

Moving to process 7.6 (BeamTrainingFeedback-1), logic and/or features at UE 205 may transmit beam training feedback destined for small cell BS 220 responsive to receiving the first set of beam training signals. In some examples, the logic and/or features at UE 205 may select (from the first set of beam training signals received in the previous step) a signal having the best reception quality (e.g., with the highest received signal power) and indicate that selection in the beam training feedback. In some examples, the beam training feedback may first be transmitted through UE 205's LTE-A air or Uu interface and over cellular WL 211 to macro cell BS 210.

Moving to process 7.7 (BeamTrainingFeedback-1), logic and/or features at macro cell BS 210 may be capable of forwarding the beam training feedback for the first set of beam training signals to small cell BS 220. In some examples, the logic and/or features at macro cell BS 210 may be capable of forwarding the beam training feedback through its X2 interface and over BH channel 215 to small cell BS 220.

Moving to process 7.8 (BeamTrainingSignal-2-1 to BeamTrainingSignal-2-n), logic and/or features at small cell BS 220 may then derive, based on received beam training feedback, a first estimation about optimal beam characteristics (e.g., beam direction) and then generate a second set of beam training signals. As illustrated in FIG. 7, the second set of beam training signals may include BeamTrainingSignal-2-1 to BeamTrainingSignal-2-n that may be transmitted based on this first estimation. For these examples, the second set of beam training signals may be transmitted over the first wireless link (e.g., the beam-formed or mmWave wireless link).

Moving to process 7.9 (BeamTrainingFeedback-2), logic and/or features at UE 205 may transmit beam training feedback destined for small cell BS 220 responsive to receiving the second set of beam training signals. In some examples, the logic and/or features at UE 205 may repeat the actions described above for process 7.6.

Moving to process 7.10 (BeamTrainingFeedback-2), logic and/or features at macro cell BS 210 may forward the beam training feedback for the second set of beam training signals to small cell BS 220. In some examples, the beam training feedback may be forwarded through BS 210's X2 interface and over BH channel 215 to small cell BS 220.

Moving to process 7.11 (Establish Beam-Formed/mm-Wave Wireless Link), logic and/or features at both UE 205 and small cell BS 220 may complete configuration of the first wireless link as a beam-formed or mmWave wireless link such as mmWave WL 222. In some examples, once established, mmWave WL 222 may be a first connection of a dual connection that has a second connection over cellular WL 211 with macro cell BS 210. UE 205 may then be capable of accessing a network managed by EPC 250 via the dual connection with macro cell BS 210 serving as a primary cell and the small cell BS 220 serving as a secondary cell. Process 700 may then come to an end if no further adjustments to mmWave WL 222 are needed. According to some examples, macro cell BS 210 may be capable of serving as an anchor BS and small cell BS 220 may be capable of serving as a booster BS.

Figure 8:
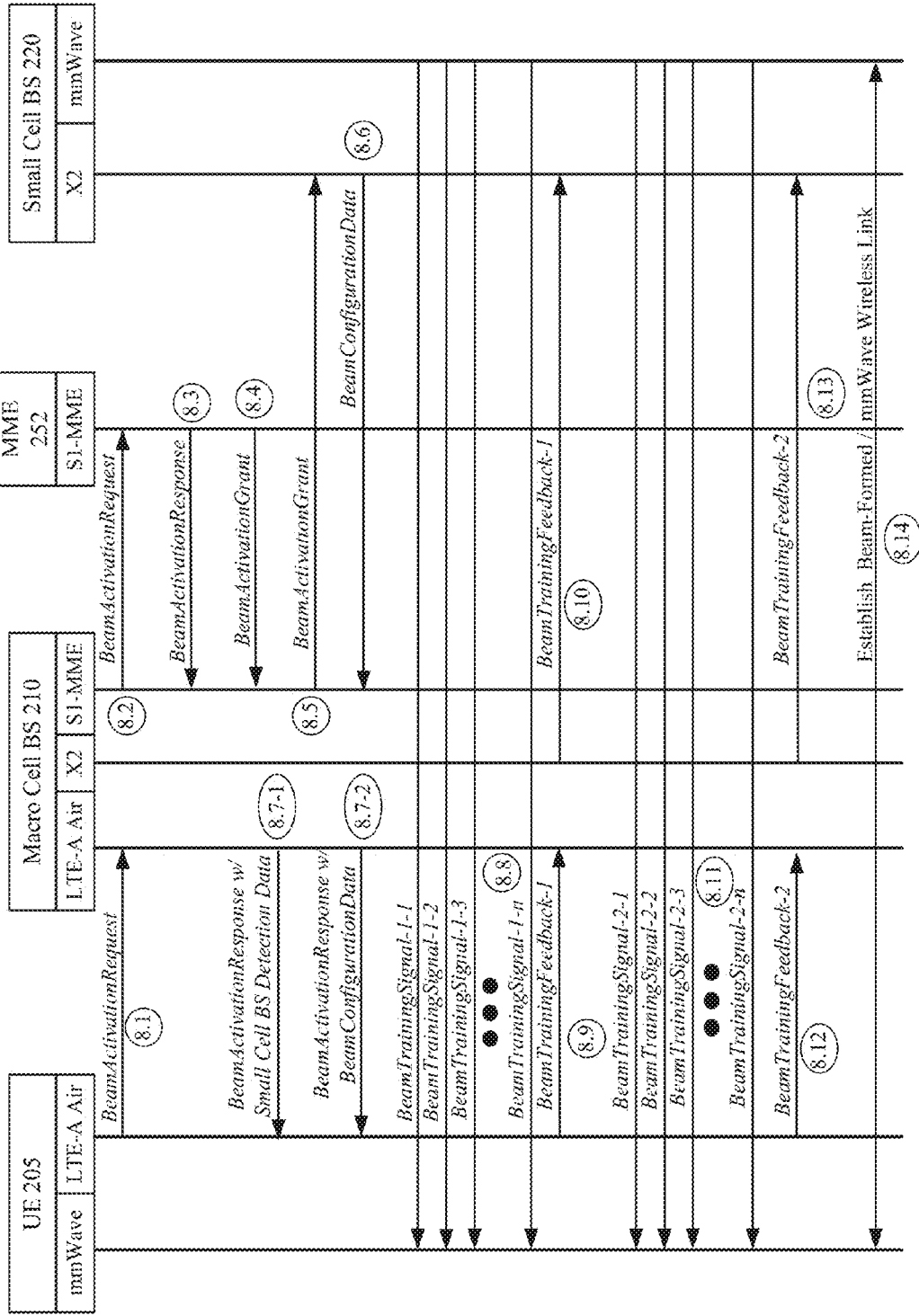
FIG. 8 illustrates an example third process.

FIG. 8 illustrates an example third process. In some examples, as shown in FIG. 8, the third process includes process 800. Process 800 may be for initiating and then establishing a beam-formed or mmWave wireless link between a UE and a small cell BS. For these examples, elements of system 200 as shown in FIG. 2B may be used to illustrate example operations related to process 800. Also, information included in beam activation request or response messages as described for beam activation request or response message formats shown in FIGS. 4 and 5 may be exchanged between these elements. However, the example process 800 is not limited to implementations using elements of system 200 or to example message formats shown in FIGS. 4 and 5.

Beginning at process 8.1 (BeamActivationRequest), logic and/or features at UE 205 may generate a beam activation request message in the example format of beam activation request message format 400. For these examples, the beam activation request message may include device or UE detection information for small cell BS (e.g., small cell BS 220) to identify and locate UE 205, location information and capability information. In some examples, the beam activation request message may be to initiate configuration of a first wireless link as a beam-formed or mmWave wireless link (e.g., mmWave WL 222) configured to transmit or receive signals in a 57-64 GHz or 20-30 GHz radio frequency band. Also, for these examples, the beam activation request message may be transmitted through an LTE-A air or Uu interface and over a second wireless link with a macro cell BS such as macro cell BS 210 that may be configured as an LTE-A compliant cellular wireless link such as cellular WL 211.

Moving to process 8.2 (BeamActivationRequest), logic and/or features at macro cell BS 210 may be capable of forwarding the beam activation request message to a management entity at EPC 250 such as MME 252. In some examples, the logic and/or features at macro cell BS 210 may be capable of forwarding the activation request message through an S1-MME interface and over a c-plane channel coupled to MME 252 such as c-plane channel 251.

Moving to process 8.3 (BeamActivationResponse), logic and/or features at MME 252 may generate a beam activation response message responsive to the beam activation request message that originated from UE 205, forwarded over c-plane channel 251 and received through an S1-MME interface at MME 252. For these examples, the beam activation response message may be in the example format of beam activation response message format 500 and may include information for a small cell BS that may be arranged to fulfill the beam activation request made by UE 205. For example, MME 252 may be aware of both the location of UE 205 and of one or more small cell BSs deployed within the macro cell area for macro cell 210. Also, MME 252 may verify or authenticate UE 205 to ensure that UE 205 has the right (e.g., a subscription or roaming agreement) to configure or set up a beam-formed or mmWave wireless link with a small cell base station such as small cell BS 220 to eventually establish a dual connection. If the request in not granted, only a grant indication that it was not granted may be included in field 505 of the beam activation response message in the format of beam activation response message format 500. Otherwise, if granted, the beam activation response message may indicate the grant, may include small cell BS detection data for small cell BS 220 and beam configuration data. The small cell BS detection data may include location information, an identifier and small cell transmission capabilities for small cell BS 220. The beam configuration data may include a beam identifier, power ramp information, sleep and active mode configurations, beam resource information or code sequence information, e.g., obtained by MME 252 from small cell BS 220. Also, for these examples, the beam activation request message may be transmitted through the S1-MME interface at MME 252 and over c-plane channel 251 to macro cell BS 210.

Moving to process 8.4 (BeamActivationGrant), logic and/or features at MME 252 may be capable of generating a beam activation grant message that is destined for small cell BS 220 to indicate that a beam activation request has been granted for UE 205 to initiate configuration of a beam-formed or mmWave wireless link. For these examples, the beam activation grant message may be in a similar format as beam activation request message format 400 so that small cell BS 220 has the information needed to identify, locate and determine UE 205's capabilities. The grant indication may be an added field to generate a beam grant message that is in a similar format to beam activation request message format 400.

Moving to process 8.5 (BeamActivationGrant), logic and/or features at macro cell BS 210 may be capable of forwarding the beam activation grant message to small cell BS 220 to indicate that the beam activation request originating from UE 205 has been granted. In some examples, the logic and/or features at macro cell BS 210 may be capable of forwarding the beam activation grant message through an X2 interface and over a BH channel coupled to small cell BS 220 such as BH channel 215.

Moving to process 8.6 (BeamConfigurationData), logic and/or features at small cell BS 220 may be capable of sending beam configuration data directly to macro cell BS 210 responsive to receiving the beam activation grant message. In some examples, this may be an alternative to having MME 252 relay beam configuration data as this type of data may constantly change and may place a burden on MME 252 to have to relay this information to macro cell BS 210. Also, not going through MME 252 may allow for UE 205 to receive the beam configuration data in a more timely manner.

Moving to process 8.7-1 (BeamActivationResponse w/Small Cell BS Detection Data), logic and/or features at macro cell BS 210 may be capable of forwarding the beam activation response message to UE 205 that. In some examples, the logic and/or features at macro cell BS 210 may be capable of forwarding the activation request message that includes small cell BS detection data for small cell BS 220 as well as the grant information through an LTE-A Air or Uu interface and over cellular WL 211 coupled to UE 205.

Moving to process 8.7-1 (BeamActivationResponse w/Small Cell BS Detection Data), logic and/or features at macro cell BS 210 may be capable of forwarding the beam activation response message to UE 205. In some examples, the logic and/or features at macro cell BS 210 may be capable of forwarding the activation request message that includes small cell BS detection data for small cell BS 220 as well as the grant information through an LTE-A Air or Uu interface and over cellular WL 211 coupled to UE 205.

Moving to process 8.7-2 (BeamActivationResponse w/BeamConfigurationData), logic and/or features at macro cell BS 210 may be capable of forwarding another beam activation response message to UE 205. In some examples, the logic and/or features at macro cell BS 210 may be capable of forwarding the activation request message that includes beam configuration data for small cell BS 220 through an LTE-A Air or Uu interface and over cellular WL 211 coupled to UE 205. UE 205 may then configure its transceiver circuitry to prepare for reception of beam training signals from small BS 220.

Moving to process 8.8 (BeamTrainingSignal-1-1 to BeamTrainingSignal-1-n), logic and/or features at small cell BS 220 may transmit a first set of beam training signals illustrated in FIG. 8 as BeamTrainingSignal-1-1 to BeamTrainingSignal-1-n. For these examples, the first set of beam training signals may be sent through an mmWave interface (e.g., configured as a WiGig interface) and over the first wireless link that is to be configured as mmWave WL 222. The first set of beam training signals may be transmitted based on at least some of the information included in the beam activation request message that originated from UE 205 (and/or on at least some of the information included in the beam activation grant message that originated from the MME 252 and was forwarded by the macro cell BS 220). The first set of beam training signals may include beam adjustment data. The beam adjustment data may include a beam identifier and information regarding modified beam directions (e.g., horizontal and vertical).

Moving to process 8.9 (BeamTrainingFeedback-1), logic and/or features at UE 205 may transmit beam training feedback destined for small cell BS 220 responsive to receiving the first set of beam training signals. In some examples, the logic and/or features at UE 205 may select (from the first set of beam training signals received in the previous step) a signal having the best reception quality and indicate that selection in the beam training feedback. In some examples, the beam training feedback may first be transmitted through UE 205's LTE-A air or Uu interface and over cellular WL 211 to macro cell BS 210.

Moving to process 8.10 (BeamTrainingFeedback-1), logic and/or features at macro cell BS 210 may be capable of forwarding the beam training feedback for the first set of beam training signals to small cell BS 220. In some examples, the logic and/or features at macro cell BS 210 may be capable of forwarding the beam training feedback through its X2 interface and over BH channel 215 to small cell BS 220.

Moving to process 8.11 (BeamTrainingSignal-2-1 to BeamTrainingSignal-2-n), logic and/or features at small cell BS 220 may then derive, based on received beam training feedback, a first estimation about optimal beam characteristics (e.g., beam direction) and then generate a second set of beam training signals. As illustrated in FIG. 8, the second set of beam training signals may include BeamTrainingSignal-2-1 to BeamTrainingSignal-2-n that may be transmitted based on this first estimation. For these examples, the second set of beam training signals may be transmitted over the first wireless link (e.g., the beam-formed or mmWave wireless link).

Moving to process 8.12 (BeamTrainingFeedback-2), logic and/or features at UE 205 may transmit beam training feedback destined for small cell BS 220 responsive to receiving the second set of beam training signals. In some examples, the logic and/or features at UE 205 may repeat the actions described above for process 8.9.

Moving to process 8.13 (BeamTrainingFeedback-2), logic and/or features at macro cell BS 210 may forward the beam training feedback for the second set of beam training signals to small cell BS 220. In some examples, the beam training feedback may be forwarded through BS 210's X2 interface and over BH channel 215 to small cell BS 220.

Moving to process 8.14 (Establish Beam-Formed/mmWave Wireless Link), logic and/or features at both UE 205 and small cell BS 220 may complete configuration of the first wireless link as a beam-formed or mmWave wireless link such as mmWave WL 222. In some examples, once established, mmWave WL 222 may be a first connection of a dual connection that has a second connection over cellular WL 211 with macro cell BS 210. UE 205 may then be capable of accessing a network managed by EPC 250 via the dual connection with macro cell BS 210 serving as a primary cell and the small cell BS 220 serving as a secondary cell. Process 800 may then come to an end if no further adjustments are needed for mmWave WL 222. According to some examples, macro cell BS 210 may be capable of serving as an anchor BS and small cell BS 220 may be capable of serving as a booster BS.

It should be noted that the X2 connection between two base stations, for example between a macro cell BS 111, 210, 310 (that may be capable of serving as an anchor BS) and small cell BS 121, 131, 141, 220, 320 (that may be capable of serving as a booster BS) may either be a direct connection between two base stations or a logical connection. In the latter case, data being exchanged over this logical X2 connection (such as the Beam Activation Request message and/or the Beam Activation Response message) may be routed through a third network node. In some examples, the third network node may be located in or assigned to the core network EPC or it may be otherwise under MNO (Mobile Network Operator) control. Thus, data being exchanged over the X2 connection may be evaluated, assessed, modified and processed by the third network node according to MNO policies and/or individual subscriber details.

Furthermore, it should be noted that for dual connectivity the second connection over the second wireless link (e.g., a cellular wireless link) may also be established/maintained between a UE and a small cell BS (as shown in FIG. 3 and discussed in the context of process 600). It doesn't have to be established/maintained between a UE and a macro cell BS in all cases.

According to some examples, a UE operating in compliance with one or more 3GPP LTE standards including LTE-A may need some modifications or enhancements for various protocols processed or handled through an LTE-A air or Uu interface. For example, in order to achieve extremely low latency, a new signaling method at the physical layer (PHY) may be introduced for beamforming related data. Special commands could be defined and used for the PDCCH (physical downlink control channel), or for a novel PBFCH (physical beam forming control channel). These commands could for instance be used to request change (reduce or rise) of transmission power of the mmWave transmissions, and/or to step wise adjust the tilt/direction of the antenna beam, and so on. The link budget difference of an mmWave directed (="beam-formed") and non-directed transmission (e.g., a cellular wireless link) may be in the range of 25 dBm. The presence of an established cellular wireless link as reliable feedback channel may allow for optimization algorithms to "swing" over the optimal position and settle to an optimum lobe by an iterative process. Optimization in azimuth and elevation of the beam may be done in a sequential or joint optimization algorithm. Important is that transmitted training signals are detected in the UE, and the information for training signal feedback allows for a small cell BS to deduce how close its antenna(s) are steered to an optimal position.

In some examples, enhancements to media access control (MAC) control elements (CEs) may also be needed. For example, for an LTE-A air interface, a MAC protocol data unit (PDU) may include a MAC payload part and a MAC header part. The MAC payload may convey multiple units of MAC CEs in addition to MAC service data units (SDUs) received from higher protocol layers. Therefore, the MAC header may also be divided into sub-headers depending on the units carried in the MAC payload, as MAC sub-headers describe the MAC payload units. Also, for these examples, various combinations of MAC CEs are possible such as MAC SDUs or MAC padding derivatives. According to some examples, special MAC CEs may be utilized for the control of beamforming operations. MAC signaling may offer a rapid way to exchange information (not as fast as a PHY enhancement, but with a little bit more payload compared to a PHY enhancement), so it could also be used to transmit requests to change (reduce or rise) the transmission power of the mmWave transmissions and/or to step wise adjust the tilt/direction of the antenna beam, and so on.

According to some examples, enhancement to radio resource control (RRC) protocol processing may be needed for the LTE-A air or Uu interface. For example, as described more below, RRC message pairs may be exchanged between a UE and either a macro or small cell BS. For this example it may be assumed that signaling radio bearers (SRBs) were successfully established between the BS and the UE so that a c-plane channel may be utilized to exchange beamforming related data between these two entities. It may be beneficial to define and use a new type of SRB for the exchange of beam forming related data and to prioritize all SRBs as indicated below in Table I.

Table I

SRB0 may be for RRC messages using a common control channel (CCCH);

SRB1 may be for RRC messages as well as for non-access stratum (NAS) messages prior to the establishment of SRB2, all using a dedication control channel (DCCH);

SRB2 may be for RRC messages which include logged measurement information as well as for NAS messages, all using DCCH.

SRB2 may have a lower priority than SRB1 and may always be configured by EUTRAN following security activation.

SRB3 (new) could be defined for RRC messages containing beam forming related data. If required for the transport of beam forming related data, SRB3 could be assigned a higher priority than SRB1 and SRB2.

In some examples, enhancement to NAS protocol processing may be needed for the LTE-A air or Uu interface and possibly for an S1-MME interface at a macro cell BS or management entity for an EPC. For these examples, in contrast to RRC Messages that terminate at a BS, NAS messages terminate at the MME. On an LTE-A air or Uu interface, for example, NAS messages may be piggybacked in RRC messages. For these examples, an assumption may be made that all relevant SRBs were successfully established between the BS and a UE, so that NAS messages can be used to exchange beamforming related data between the UE and the MME. NAS may independently apply integrity protection and ciphering to the NAS messages.

According to some examples, u-plane enhancements may be needed for the LTE-A air or Uu interface. For these examples, an assumption may be made that (in addition to all SRBs) at least one data radio bearer (DRB) was successfully established between a BS and a UE so that beam forming related data can be exchanged on a u-plane channel between the UE and the BS.

In some examples, enhancements may also be needed for communication over a BH channel between a macro cell BS and a small cell BS. For these examples, it may be assumed that an X2 application protocol (X2AP) or modification thereof may be used. The X2AP may include use of elementary procedures (EPs). An EP may be a unit of interaction between two BSs. For these examples, each EP may include an initiating message and possibly a response message. According to X2AP, two EPs may exist; (1) Class 1 EP may be an EP with a response, (2) Class 2 EP may be an EP without a response. Thus, in some examples, exchange of beam forming related data by means of (modified/enhanced) X2AP messages may be accomplished over a BH channel between BSs. These (modified/enhanced) X2AP messages may either complement an existing EP as described by X2AP or may make a new EPs.

According to some examples, existing Class 1 EPs that may be enhanced are listed in Table II. The various notes depicted as A, B and C in the right column may indicate suitability of various EPs for enhancements. "A" may indicate that a given EP may be used to exchange initial beam forming data when one of the involved BSs triggers establishment of a new physical mmWave wireless link. "B" may indicate that a given EP may be used for constant exchange of beam forming data intended to keep a physical mmWave wireless link alive or maintained. "C" may be used to exchange final beam forming data when one of the involved BSs has decided to terminate a physical mmWave wireless link.

TABLE II

| Elementary Procedure | Initiating Message | Response Message - Successful Outcome | Response Message - Unsuccessful Outcome | Note |
|---|---|---|---|---|
| Handover Preparation | HANDOVER REQUEST | HANDOVER REQUEST ACKNOWLEDGE | HANDOVER PREPARATION FAILURE | A and C |
| Reset | RESET REQUEST | RESET RESPONSE | | C |
| X2 Setup | X2 SETUP REQUEST | X2 SETUP RESPONSE | X2 SETUP FAILURE | A |
| eNB Configuration Update | ENB CONFIGURATION UPDATE | ENB CONFIGURATION UPDATE ACKNOWLEDGE | ENB CONFIGURATION UPDATE FAILURE | B |
| Resource Status Reporting Initiation | RESOURCE STATUS REQUEST | RESOURCE STATUS RESPONSE | RESOURCE STATUS FAILURE | A and B |
| Mobility Setting Change | MOBILITY CHANGE REQUEST | MOBILITY CHANGE ACKNOWLEDGE | MOBILITY CHANGE FAILURE | A and B |
| Cell Activation | CELL ACTIVATION REQUEST | CELL ACTIVATION RESPONSE | CELL ACTIVIATION FAILURE | A |

Class 1 EPs

TABLE III

Class 2 EPs

| Elementary Procedure | Initiating Message | Note |
|---|---|---|
| Load Indication | LOAD INFORMATION | A |
| Handover Cancel | HANDOVER CANCEL | C |
| SN status Transfer | SN STATUS TRANSFER | n/a |
| UE Context Release | UE CONTEXT RELEASE | C |
| Resource Status Reporting | RESOURCE STATUS UPDATE | B |
| Error indication | ERROR INDICATION | B |
| Radio Link Failure Indication | RLF INDICATION | A, B and C |
| Handover Report | HANDOVER REPORT | A |

According to some examples, existing Class 2 EPs that may be enhanced are listed above in Table III. The various notes A, B and C defined above for Class 1 EPs also apply to Table III.

According to some examples, new EPs could also be defined to enable beam forming information to be exchanged over a BH channel between BSs. New Class 1 EPs are shown below in Table IV and new Class 2 EPs are shown below in Table V. The same notes for A, B and C as defined above apply to Tables IV and V as well.

TABLE IV

New Class 1 EPs

| Elementary Procedure | Initiating Message | Response Message - Successful Outcome | Response Message - Unsuccessful Outcome | Note |
|---|---|---|---|---|
| Beam Establishment | BEAM FORMING REQUEST | BEAM FORMING ACKNOWLEDGE | BEAMING FORMING FAILURE | A |
| Beam Maintenance | BEAM MAINTENANCE REQUEST | BEAM MAINTENANCE ACKNOWLEDGE | BEAM MAINTENANCE FAILURE | B |
| Beam Termination | BEAM TERMINATION REQUEST | BEAM TERMINATION ACKNOWLEDGE | BEAM TERMINATION FAILURE | C |

TABLE V

New Class 2 EPs

| Elementary Procedure | Initiating Message | Note |
|---|---|---|
| Beam Establishment | BEAM FORMING REQUEST | A |
| Beam Maintenance | BEAM MAINTENANCE REQUEST | B |
| Beam Termination | BEAM TERMINATION REQUEST | C |

Figure 9:
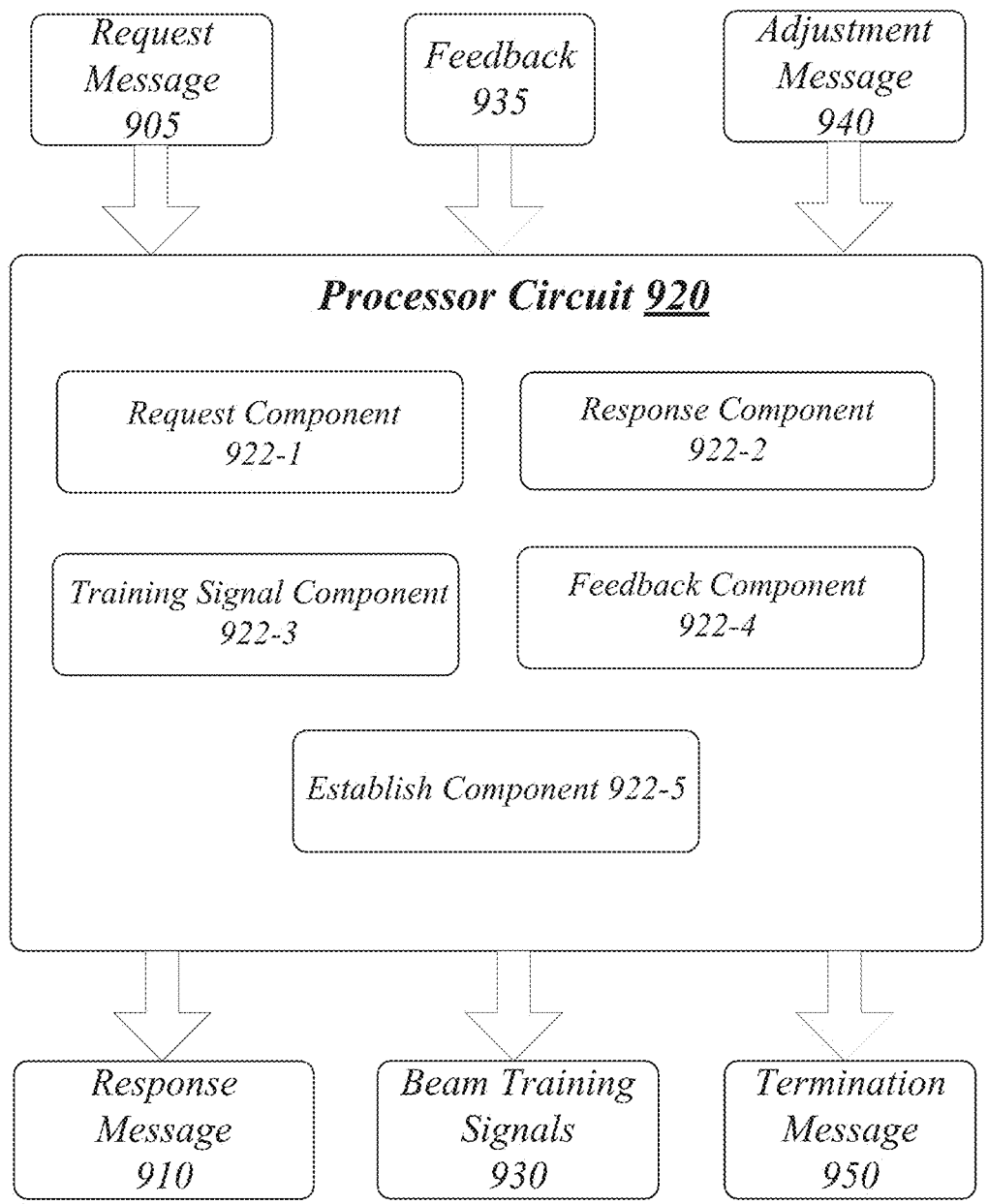
FIG. 9 illustrates an example block diagram for a first apparatus.

FIG. 9 illustrates a block diagram for an example first apparatus. As shown in FIG. 9, the example first apparatus includes apparatus 900. Although apparatus 900 shown in FIG. 9 has a limited number of elements in a certain topology, it may be appreciated that the apparatus 900 may include more or less elements in alternate topologies as desired for a given implementation.

The apparatus 900 may comprise a computer-implemented apparatus 900 having a processor circuit 920 arranged to execute one or more software components 922-a. It is worthy to note that "a" and "b" and "c" and similar designators as used herein are intended to be variables representing any positive integer. Thus, for example, if an implementation sets a value for a=5, then a complete set of software components 922-a may include components 922-1, 922-2, 922-3, 922-4 and 922-5. The examples are not limited in this context.

According to some examples, apparatus 900 may be implemented in system equipment (e.g., located at or with a small cell BS), such as network equipment for a communications system or network compliant with one or more 3GPP LTE Specifications. For example, apparatus 900 may be implemented as part of a base station or eNB for an LTE and/or LTE-A compliant wireless network arranged as a small cell BS or eNB coupled to a macro cell BS or eNB via a BH channel and also arranged to couple with a UE via an mmWave or cellular wireless link. Although some examples are described with reference to a base station or eNB, examples may utilize any network equipment for a communications system or network. The examples are not limited in this context.

In some examples, as shown in FIG. 9, apparatus 900 includes processor circuit 920. Processor circuit 920 may be generally arranged to execute one or more software components 922-a. The processing circuit 920 can be any of various commercially available processors, including without limitation an AMD® Athlon®, Duron® and Opteron® processors; ARM® application, embedded and secure processors; Qualcomm® Snapdragon, IBM® and Motorola® DragonBall® and PowerPC® processors; IBM and Sony® Cell processors; Intel® Celeron®, Core (2) Duo®, Core i3, Core i5, Core i7, Itanium®, Pentium®, Xeon®, Atom®, and XScale® processors; and similar processors. Dual microprocessors, multi-core processors, and other multi-processor architectures may also be employed as processing circuit 920. According to some examples, processor circuit 920 may also be an application specific integrated circuit (ASIC) and at least some components 922-a may be implemented as hardware elements of the ASIC.

According to some examples, apparatus 900 may include a request component 922-1. Request component 922-1 may be executed by processor circuit 920 to receive a beam activation request message that includes information to initiate configuration of a first wireless link as a beam-formed or mmWave wireless link between a UE and a small cell BS that includes apparatus 900. For these examples, the beam activation request message may be included in request message 905 and may be in the format of beam activation request message format 400.

In some examples, apparatus 900 may also include a response component 922-2. Response component 922-2 may be executed by processor circuit 920 to cause a beam activation response message destined for the UE to be transmitted. The beam activation response message may include beamforming configuration data for the UE to configure transceiver circuitry for the beam-formed or mmWave wireless link with the small cell BS including apparatus 900. For these examples, the beam activation response message may be included in response message 910 and may be in the format of beam activation response message format 500. Also, in some examples, response message 910 may either be sent directly to the UE via a cellular wireless link with the UE (see FIG. 3) or routed through a macro cell BS (see FIGS. 2A-B) over a BH channel.

In some examples, apparatus 900 may also include a training signal component 922-3. Training signal component 922-3 may be executed by processor circuit 920 to cause a plurality of beam training signals to be transmitted to the UE over the first wireless link. For these examples, the plurality of beam training signals may be included in beam training signals 930.

According to some examples, apparatus 900 may also include a feedback component 922-4. Feedback component 922-4 may be executed by processor circuit 920 to receive beam training feedback from the UE responsive to the UE receiving the plurality of beam training signals. For these examples, the training signal feedback may be included in feedback 935. In some examples, feedback 935 may be received directly via a cellular wireless link from the UE (see FIG. 3) or routed through a macro cell BS (see FIGS. 2A-B) over a BH channel.

In some examples, apparatus 900 may also include an establish component 922-5. Establish component 922-5 may be executed by processor circuit 920 to cause the exchange of beam training information between the UE and the small cell BS via the sending of the plurality of beam training signals and receiving of beam training feedback. The exchange of the beam training information may lead to establishment of the beam-formed or mmWave wireless link. The established beam-formed or mmWave wireless link may then serve as a first connection of a dual connection that has a second connection over a second wireless link with a macro cell BS serving as a primary cell and the small cell BS serving as a secondary cell. According to some examples, the macro cell BS may be capable of serving as an anchor BS and small cell BS may be capable of serving as a booster BS. The UE may then be able to access a network via this dual connection.

In some examples, feedback component 922-4 may be capable of receiving an adjustment message 940 that includes an indication from the UE that the beam-formed or mmWave wireless link needs to be adjusted. In response, feedback component 922-4 may cause training signal component 922-3 to transmit beam training signals 930 to the UE. Feedback component 922-4 may then receive feedback 935 and establish component 922-5 may ensure the adjusted beam-formed or mmWave wireless link is still able to maintain the dual connection.

According to some examples, a termination message 950 may be caused to be sent by establish component 922-5 to the UE to terminate the beam-formed or mmWave wireless link. The termination, for example, may be responsive to various events to include but not limited to a degraded signal, the UE moving out of the small or macro cell BSs service area(s) or based on a management entity's directive to terminate the beam-formed or mmWave wireless link (e.g., due to network capacity or operating issues).

Various components of apparatus 900 and a device implementing apparatus 900 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 10 illustrates an example of a logic flow 1000. Logic flow 1000 may be representative of some or all of the operations executed by one or more logic, features, or devices described herein, such as apparatus 900. More particularly, logic flow 1000 may be implemented by request component 922-1, response component 922-2, training signal component 922-3, feedback component 922-4 or establish component 922-5.

In the illustrated example shown in FIG. 10, logic flow 1000 at block 1002 may receive a beam activation request message that includes information to initiate configuration of a first wireless link as a beam-formed wireless link between a UE and a small cell base station that may include apparatus 900. For these examples, request component 922-1 may initiate the configuration.

According to some examples, logic flow 1000 at block 1004 may transmit a beam activation response message destined for the UE. The beam activation response message may include beamforming configuration data for the UE to configure transceiver circuitry for the beam-formed wireless link with the small cell base station. For these examples, response component 922-1 may cause the beam activation response message to be transmitted.

In some examples, logic flow 1000 at block 1006 may exchange beam training information between the UE and the small cell base station to establish the beam-formed wireless link as a first connection of a dual connection that has a second connection over a second wireless link with a macro cell base station. The UE may be capable of accessing a network via the dual connection with the macro cell base station serving as a primary cell and the small cell base station serving as a secondary cell. For these examples, training signal component 922-3 may cause the training signals to be transmitted to the UE. Feedback component 922-4 may receive the feedback from the UE based on the training signals and establish component 922-5 may establish the beam-formed wireless link as the first connection of the dual connection.

FIG. 11 illustrates an embodiment of a storage medium 1100. The storage medium 1100 may comprise an article of manufacture. In some examples, storage medium 1100 may include any non-transitory computer readable medium or machine readable medium, such as an optical, magnetic or semiconductor storage. Storage medium 1100 may store various types of computer executable instructions, such as instructions to implement logic flow 1000. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 12:
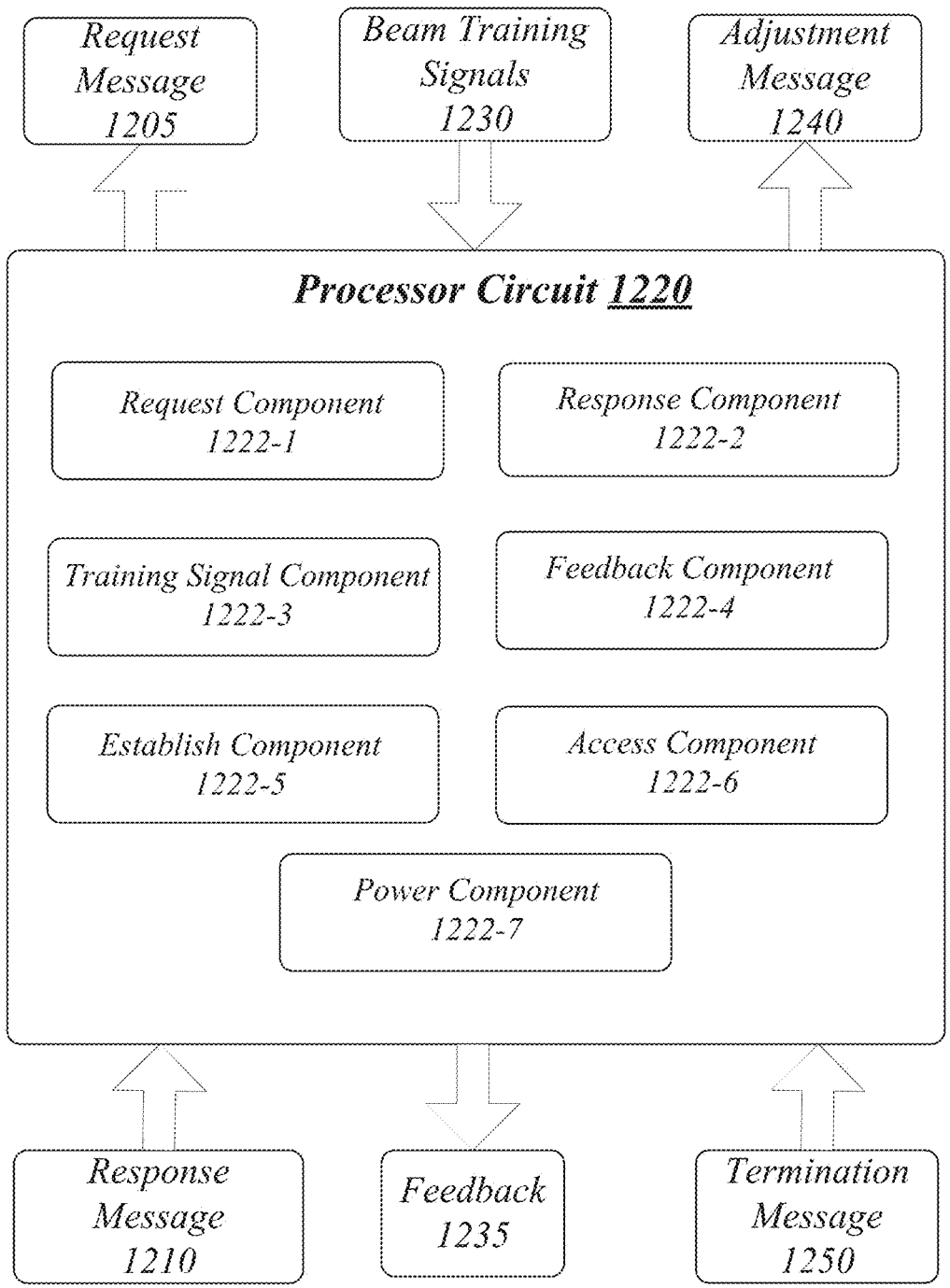
FIG. 12 illustrates an example block diagram for a second apparatus.

FIG. 12 illustrates a block diagram for an example second apparatus. As shown in FIG. 12, the example second apparatus includes apparatus 1200. Although apparatus 1200 shown in FIG. 12 has a limited number of elements in a certain topology, it may be appreciated that the apparatus 1200 may include more or less elements in alternate topologies as desired for a given implementation.

The apparatus 1200 may comprise a computer-implemented apparatus 1200 having a processor circuit 1220 arranged to execute one or more software components 1222-a. It is worthy to note that "a" and "b" and "c" and similar designators as used herein are intended to be variables representing any positive integer. Thus, for example, if an implementation sets a value for a=7, then a complete set of software components 1222-a may include components 1222-1, 1222-2, 1222-3, 1222-4, 1222-5, 1222-6 and 1222-7. The examples are not limited in this context.

According to some examples, apparatus 1200 may be implemented in user equipment (e.g., UE 105, 205 or 305) capable of operating in compliance with one or more 3GPP LTE Specifications. For example, apparatus 1200 may be capable of communicatively coupling to an LTE and/or LTE-A compliant wireless network via one or more eNBs that may be managed by an EPC. Apparatus 1200 may also be capable of couple to at least a small cell BS or eNB through an mmWave interface (e.g., configured as a WiGig interface) and over a beam-formed wireless link. The examples are not limited in this context.

In some examples, as shown in FIG. 12, apparatus 1200 includes processor circuit 1220. Processor circuit 1220 may be generally arranged to execute one or more software components 1222-a. The processing circuit 1220 can be any of various commercially available processors to include but not limited to the processors mentioned above for apparatus 900. Also, according to some examples, processor circuit 1220 may also be an ASIC and at least some components 1222-a may be implemented as hardware elements of the ASIC.

According to some examples, apparatus 1200 may include a request component 1222-1. Request component 1222-1 may be executed by processor circuit 1220 to cause a beam activation request message to be transmitted to a small cell base station over an established first wireless link with the small cell base station, the beam activation request message to initiate a second wireless link between the small cell base station and the UE that include apparatus 1200. For these examples, the beam activation request message may be included in request message 1205. Request message 1205 may be in the format of beam activation request message format 400.

In some examples, apparatus 1200 may also include a response component 1222-2. Response component 1222-2 may be executed by processor circuit 1220 to receive a beam activation response message over the first wireless link that includes beamforming configuration data to arrange transceiver circuitry to configure the second wireless link as a beam-formed wireless link. For these examples, the beam activation response message may be included in response message 1210. Response message 1210 may be in the format of beam activation response message format 500. Response message 1210, for example, may be sent either directly to the small cell BS over a cellular wireless link or routed through a macro cell BS via another cellular wireless link. The macro cell BS may then forward the response message 1210 to the small cell BS over a BH channel.

In some examples, apparatus 1200 may also include a training signal component 1222-3. Training signal component 1222-3 may be executed by processor circuit 1220 to receive a plurality of beam training signals received over the first wireless link that were transmitted by the small cell base station. For these examples, beam training signals 1230 may include the plurality of beam training signals.

In some examples, apparatus 1200 may also include a feedback component 1222-4. Feedback component 1222-5 may be executed by processor circuit 1220 to cause beam training feedback responsive to receiving the plurality of beam training signals. For these examples, the beam training feedback may be included in feedback 1235. Feedback 1235, for example, may be sent either directly to the small cell BS over a cellular wireless link or routed through a macro cell BS via another cellular wireless link. The macro cell BS may then forward feedback 1235 to the small cell BS over a BH channel.

According to some examples, apparatus 1200 may also include a establish component 1222-5. Establish component 1222-5 may be executed by processor circuit 1220 to cause the exchange of beam training information between the UE and the small cell BS via the receiving of beam training signals and sending beam training feedback. The exchange of the beam training information may lead to establishment of the beam-formed or mmWave wireless link. The established beam-formed or mmWave wireless link may then serve as a first connection of a dual connection that has a second connection over a second wireless link with a macro cell BS serving as a primary cell and the small cell BS serving as a secondary cell.

According to some examples, apparatus 1200 may also include an access component 1222-7. Access component 1222-7 may be executed by processor circuit 1220 to access a network over the dual connection with the macro cell base station serving as the primary cell and the small cell base station serving as the secondary cell.

According to some examples, apparatus 1200 may also include a power component 1222-6. Power component 1222-6 may be executed by processor circuit 1220 to cause transceiver circuitry for the first wireless link (e.g., the cellular wireless link) to be placed in a low power mode responsive to establishment of the beam-formed wireless link with the small cell base station.

In some examples, feedback component 1222-4 may be capable of sending an adjustment message 1240 that includes an indication to the small cell BS that the beam-formed or mmWave wireless link needs to be adjusted. For these examples, training signal component 1222-3 may receive additional training signals 1230. Feedback component 1222-4 may then send feedback 1235 and establish component 1222-5 may ensure the adjusted beam-formed or mmWave wireless link is still able to maintain the dual connection.

According to some examples, a termination message 1250 may be received by response component 1222-5 to indicate that the beam-formed or mmWave wireless link is to be terminated. The termination, for example, may be responsive to various events to include but not limited to a degraded signal, the UE moving out of the small or macro cell BSs service area(s) or based on a management entity's directive to terminate the beam-formed or mmWave wireless link.

Various components of apparatus 1200 and a device implementing apparatus 1200 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

FIG. 13 illustrates an example of a logic flow 1300. Logic flow 1300 may be representative of some or all of the operations executed by one or more logic, features, or devices described herein, such as apparatus 1200. More particularly, logic flow 1300 may be implemented by request component 1222-1, response component 1222-2, training signal component 1222-3, feedback component 1222-4, establish component 1222-5 or access component 1222-7.

In the illustrated example shown in FIG. 13, logic flow 1300 at block 1302 may transmit a beam activation request message to a small cell base station over an established first wireless link with the small cell base station. The beam activation request message may initiate a second wireless link between the small cell base station and a UE that includes apparatus 1200. For these examples, request component 1222-1 may cause the beam activation request message to be transmitted.

According to some examples, logic flow 1300 at block 1304 may receive a beam activation response message over the first wireless link that includes beamforming configuration data to arrange transceiver circuitry to configure the second wireless link as a beam-formed wireless link. For these examples, response component 1222-2 may receive the beam activation response message.

In some examples, logic flow 1300 at block 1306 may exchange beam training information with the small cell base station to establish the beam-formed wireless link as a first connection of a dual connection that has a second connection over a third wireless link with a macro cell base station. For these examples, training signal component 1222-3 may receive training signals from the small cell BS. Feedback component 1222-4 may send feedback to the small cell BS based on the received training signals and establish component 1222-5 may establish the beam-formed wireless link as the first connection of the dual connection.

According to some examples, logic flow 1300 at block 1308 may access a network via the dual connection with the macro cell base station serving as a primary cell and the small cell base station serving as a secondary cell. For these examples, access component 1222-6 may access the network.

FIG. 14 illustrates an embodiment of a storage medium 1400. The storage medium 1400 may comprise an article of manufacture. In some examples, storage medium 1400 may include any non-transitory computer readable medium or machine readable medium, such as an optical, magnetic or semiconductor storage. Storage medium 1400 may store various types of computer executable instructions, such as instructions to implement logic flow 1300. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 15:
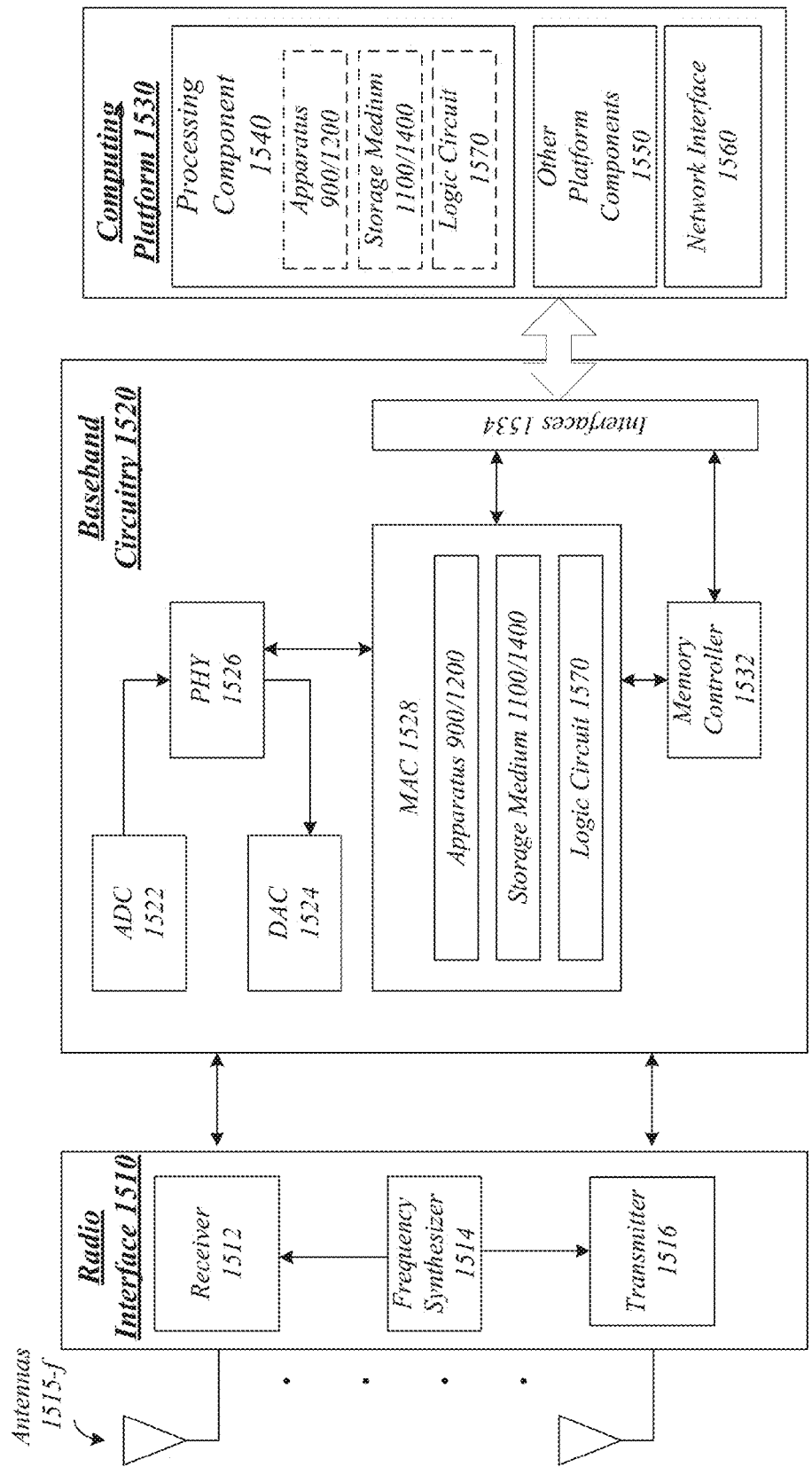
FIG. 15 illustrates an example of a device.

FIG. 15 illustrates an embodiment of a device 1500 for use in a broadband wireless access network. Device 1500 may implement, for example, apparatus 900/1200, storage medium 1100/1400 and/or a logic circuit 1570. The logic circuit 1570 may include physical circuits to perform operations described for apparatus 900/1200. As shown in FIG. 15, device 1500 may include a radio interface 1510, baseband circuitry 1520, and computing platform 1530, although examples are not limited to this configuration.

The device 1500 may implement some or all of the structure and/or operations for the apparatus 900/1200, storage medium 1100/1400 and/or logic circuit 1570 in a single computing entity, such as entirely within a single device. Alternatively, the device 1500 may distribute portions of the structure and/or operations for apparatus 900/1200, storage medium 1100/1400 and/or logic circuit 1570 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The examples are not limited in this context.

In one embodiment, radio interface 1510 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM) symbols) although the embodiments are not limited to any specific over-the-air interface or modulation scheme. Radio interface 1510 may include, for example, a receiver 1512, a transmitter 1516 and/or a frequency synthesizer 1514. Radio interface 1510 may include bias controls, a crystal oscillator and/or one or more antennas 1515-f. In another embodiment, radio interface 1510 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1520 may communicate with radio interface 1510 to process receive and/or transmit signals and may include, for example, an analog-to-digital converter 1522 for down converting received signals, a digital-to-analog converter 1524 for up converting signals for transmission. Further, baseband circuitry 1520 may include a baseband or physical layer (PHY) processing circuit 1526 for PHY link layer processing of respective receive/transmit signals. Baseband circuitry 1520 may include, for example, a processing circuit 1528 for medium access control (MAC)/data link layer processing. Baseband circuitry 1520 may include a memory controller 1532 for communicating with MAC processing circuit 1528 and/or a computing platform 1530, for example, via one or more interfaces 1534.

In some embodiments, PHY processing circuit 1526 may include a frame construction and/or detection module, in combination with additional circuitry such as a buffer memory, to construct and/or deconstruct communication frames (e.g., containing subframes). Alternatively or in addition, MAC processing circuit 1528 may share processing for certain of these functions or perform these processes independent of PHY processing circuit 1526. In some embodiments, MAC and PHY processing may be integrated into a single circuit.

Computing platform 1530 may provide computing functionality for device 1500. As shown, computing platform 1530 may include a processing component 1540. In addition to, or alternatively of, baseband circuitry 1520 of device 1500 may execute processing operations or logic for apparatus 900/1200, storage medium 1100/1400, and logic circuit 1570 using the processing component 1530. Processing component 1540 (and/or PHY 1526 and/or MAC 1528) may comprise various hardware elements, software elements, or a combination of both. Examples of hardware elements may include devices, logic devices, components, processors, microprocessors, circuits, processor circuits (e.g., processor circuit 920, 1220 or 1520), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 1530 may further include other platform components 1550. Other platform components 1550 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 1530 may further include a network interface 1560. In some examples, network interface 1560 may include logic and/or features to support X2, S1-MME or S1-U interfaces as described in one or more 3GPP LTE or LTE-A specifications or standards. For these examples, network interface 1560 may enable an apparatus 1500 or 1500 located at an eNB, MME or SWG to communicatively couple through backhaul, control plane or user plane channels. In some other examples, network interface 1560 may include logic and/or features to support other communication interfaces described in the one or more 3GPP LTE or LTE-A specifications. For these examples, network interface 1560 may enable an apparatus 1200 located with a UE or an apparatus 900 located with an eNB to communicatively couple to one or more other eNBs via a wireless communications link.

Device 1500 may be, for example, user equipment, a computer, a personal computer (PC), a desktop computer, a laptop computer, an ultrabook computer, a smartphone, a tablet computer, a notebook computer, a netbook computer, a server, a server array or server farm, a web server, a network server, an Internet server, a work station, a mini-computer, a main frame computer, a supercomputer, a network appliance, a web appliance, a distributed computing system, multiprocessor systems, processor-based systems, wireless access point, base station, node B, evolved node B, subscriber station, mobile subscriber center, radio network controller, router, hub, gateway, bridge, switch, machine, or combination thereof. Accordingly, functions and/or specific configurations of device 1500 described herein, may be included or omitted in various embodiments of device 1500, as suitably desired. In some embodiments, device 1500 may be configured to be compatible with protocols and frequencies associated one or more of the 3GPP LTE Specifications and/or IEEE 802.16 Standards for WMANs, and/or other broadband wireless networks, cited herein, although the examples are not limited in this respect.

Embodiments of device 1500 may be implemented using single input single output (SISO) architectures. However, certain implementations may include multiple antennas (e.g., antennas 1515-f) for transmission and/or reception using adaptive antenna techniques for beamforming or spatial division multiple access (SDMA) and/or using multiple input multiple output (MIMO) communication techniques.

The components and features of device 1500 may be implemented using any combination of discrete circuitry, application specific integrated circuits (ASICs), logic gates and/or single chip architectures. Further, the features of device 1500 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1500 shown in the block diagram of FIG. 15 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in examples.

Figure 16:
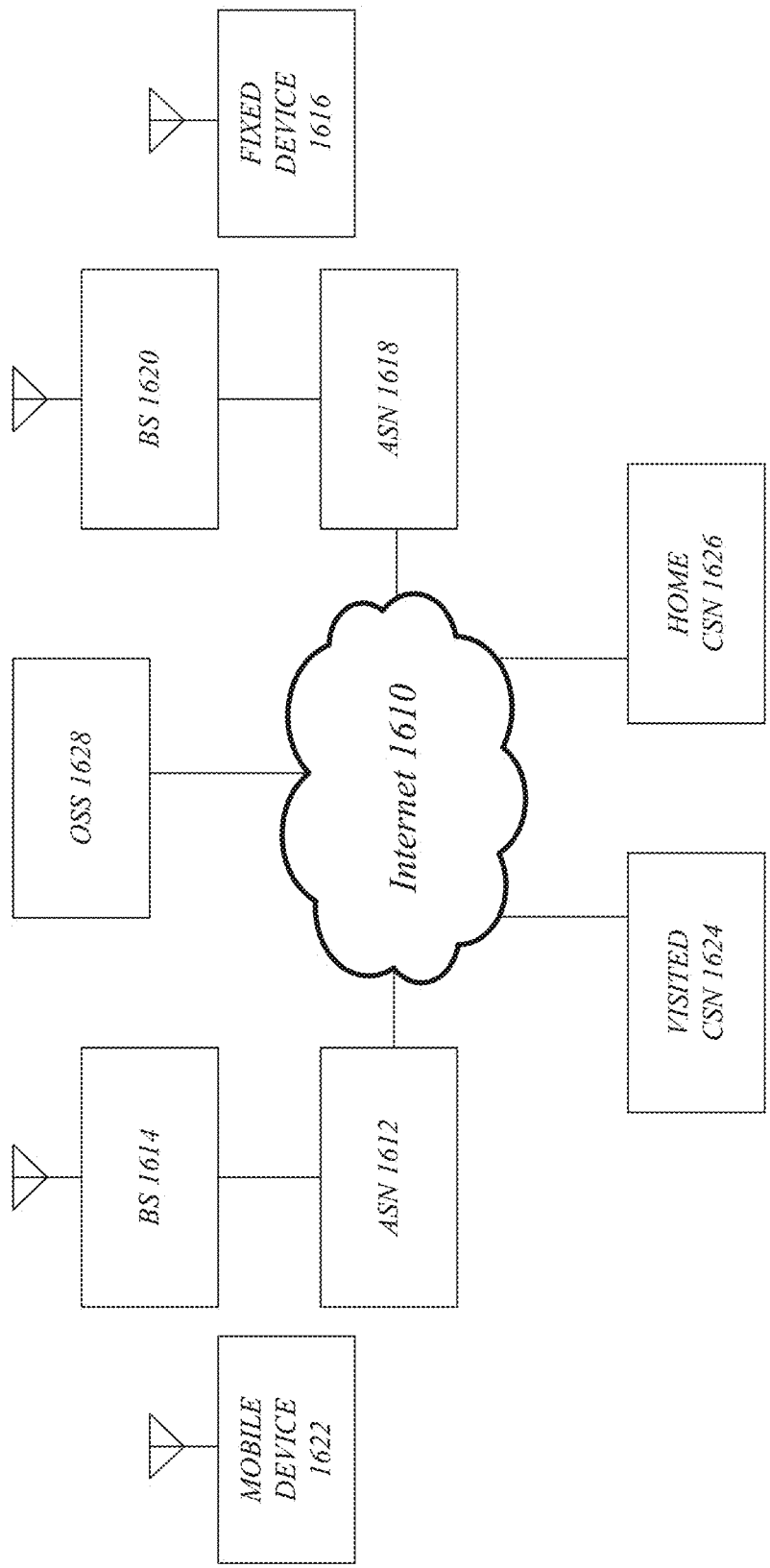
FIG. 16 illustrates an example of a broadband wireless access system.

FIG. 16 illustrates an embodiment of a broadband wireless access system 1600. As shown in FIG. 16, broadband wireless access system 1600 may be an internet protocol (IP) type network comprising an internet 1610 type network or the like that is capable of supporting mobile wireless access and/or fixed wireless access to internet 1610. In one or more embodiments, broadband wireless access system 1600 may comprise any type of orthogonal frequency division multiple access (OFDMA) and/or multiple single carrier frequency division multiple access (multiple SC-FDMA) based wireless network, such as a system compliant with one or more of the 3GPP LTE Specifications and/or IEEE 802.16 Standards, and the scope of this disclosure is not limited in these respects.

In the exemplary broadband wireless access system 1600, access service networks (ASN) 1614, 1618 are capable of coupling with base stations (BS) 1614, 1620 (RRHs or eNBs), respectively, to provide wireless communication between one or more fixed devices 1616 and internet 1610, or one or more mobile devices 1622 and Internet 1610. One example of a fixed device 1616 and a mobile device 1622 is UE 205 with the fixed device 1616 comprising a stationary version of UE 202 and the mobile device 1622 comprising a mobile version of UE 205. ASN 1612 may implement profiles that are capable of defining the mapping of network functions to one or more physical entities on broadband wireless access system 1600. Base stations 1614, 1620 (or eNBs) may comprise radio equipment to provide RF communication with fixed device 1616 and mobile device 1622, such as described with reference to device 1600, and may comprise, for example, the PHY, MAC, RLC or PDCP layer equipment in compliance with a 3GPP LTE Specification or an IEEE 802.16 Standard. Base stations 1614, 1620 (or eNBs) may further comprise an IP backplane to couple to Internet 1610 via ASN 1612, 1618, respectively, although the scope of the claimed subject matter is not limited in these respects.

Broadband wireless access system 1600 may further comprise a visited connectivity service network (CSN) 1624 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CSN 1624 or home CSN 1626, and the scope of the claimed subject matter is not limited in these respects. Visited CSN 1624 may be referred to as a visited CSN in the case where visited CSN 1624 is not part of the regular service provider of fixed device 1616 or mobile device 1622, for example where fixed 1616 or mobile device 1622 is roaming away from their respective home CSN 1626, or where broadband wireless access system 1600 is part of the regular service provider of fixed device 1616 or mobile device 1622 but where broadband wireless access system 1600 may be in another location or state that is not the main or home location of fixed device 1616 or mobile device 1622.

Fixed device 1616 may be located anywhere within range of one or both base stations 1614, 1620, such as in or near a home or business to provide home or business customer broadband access to Internet 1610 via base stations 1614, 1620 and ASN 1612, 1618, respectively, and home CSN 1626. It is worthy to note that although fixed device 1616 is generally disposed in a stationary location, it may be moved to different locations as needed. Mobile device 1622 may be utilized at one or more locations if mobile device 1622 is within range of one or both base stations 1614, 1620, for example.

In accordance with one or more embodiments, operation support system (OSS) 1628 may be part of broadband wireless access system 1600 to provide management functions for broadband wireless access system 1600 and to provide interfaces between functional entities of broadband wireless access system 1600. Broadband wireless access system 1600 of FIG. 16 is merely one type of wireless network showing a certain number of the components of broadband wireless access system 1600, and the scope of the claimed subject matter is not limited in these respects.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," " "second," "third," and so forth, are used merely as labels, and are not intended to impose numerical requirements on their objects.

In some examples, an example first apparatus may include a processor circuit for a small cell base station. The first apparatus may also include a request component for execution by the processor circuit to receive a beam activation request message that includes information to initiate configuration of a first wireless link as a beam-formed wireless link between a UE and the small cell base station. The first apparatus may also include a response component for execution by the processor circuit to cause a beam activation response message destined for the UE to be transmitted. The beam activation response message may include beamforming configuration data for the UE to configure transceiver circuitry for the beam-formed wireless link with the small cell base station. The first apparatus may also include an establish component for execution by the processor circuit to cause an exchange of beam training information between the UE and the small cell base station to establish the beam-formed wireless link as a first connection of a dual connection that has a second connection over a second wireless link with a macro cell base station. For these examples, the UE may be capable of accessing a network via the dual connection with the macro cell base station serving as a primary cell and the small cell base station serving as a secondary cell.

According to some examples for the first apparatus, the first wireless link may include a mmWave wireless link arranged to transmit or receive signals in a 57-64 GHz, a 20-30 GHz a 57-66 GHz, a 64-66 GHz, a 71-76 GHz, a 81-86 or a 92-95 GHz radio frequency band.

In some examples for the first apparatus, the beam activation request message may include UE detection data also including location information for the UE, an identifier for the UE or UE transmission capabilities.

According to some examples for the first apparatus, the beam activation response message may include a grant for the beam activation and small cell base station detection data including location information for the small cell base station, an identifier for the small cell base station or small cell base station transmission capabilities, the beam configuration data included in the beam activation response message including a beam identifier, power ramp information, sleep mode configuration, active mode configuration, beam resource information or code sequence information.

In some examples for the first apparatus, the exchanged beam training information may be exchanged over the first wireless link for the establish component to establish the beam-formed wireless link.

According to some examples, the first apparatus may also include a training signal component for execution by the processor circuit to cause a plurality of beam training signals to be transmitted to the UE over the first wireless link. The first apparatus may also include a feedback component for execution by the processor circuit to receive beam training feedback from the UE responsive to the UE receiving the plurality of beam training signals. The establish component may establish the beam-formed wireless link with the UE based on beam training feedback received by the feedback component.

In some examples for the first apparatus, the request component may receive the beam activation request message via a backhaul channel between the macro and small cell base stations.

According some examples for the first apparatus, the beam activation request message may originate from the UE and received at the macro cell base station over the second wireless link. For these examples, the macro cell base station may forward the beam activation request to the small cell base station over the backhaul channel.

In some examples for the first apparatus, the response component may cause the beam activation response message destined for the UE to be transmitted over the backhaul channel to macro cell base station. For these examples, the beam activation response message may be capable of being forwarded by the macro cell base station to the UE over the second wireless link.

According to some examples for the first apparatus, the small cell base station, the macro cell base stations and the UE may each be arranged to operate in compliance with one or more 3GPP LTE standards including LTE-A. For these examples, the small cell base stations may be configured as an eNB having an X2 interface to receive or transmit messages over the backhaul channel. The UE may have an LTE-A air or Uu interface to transmit or receive messages with the macro cell base station over the second wireless link.

In some examples for the first apparatus, the request component may receive the beam activation response message and the response component may cause the beam activation response message to be transmitted through the X2 interface.

According to some examples for the first apparatus, the beam activation request message may originate from the UE and the request component to receive the beam activation request via a third wireless link coupled between the UE and the small cell base station and the response component to cause the beam activation response message to be transmitted over the third wireless link.

In some examples for the first apparatus, the small cell base station, the macro cell base stations and the UE may each be arranged to operate in compliance with one or more 3GPP LTE standards including LTE-A. For these examples the small and macro cell base stations configured as evolved node Bs (eNBs). The small cell eNB may have an LTE-A air or Uu interface for the request component to receive the beam activation request message or the response component to transmit the beam activation response message to the UE over the third wireless link.

According to some examples, the first apparatus also include a digital display coupled to the processor circuit to present a user interface view.

In some examples, an example first at least one machine readable medium may include a plurality of instructions that in response to being executed on a system for a small cell based station causes the system to receive a beam activation request message that includes information to initiate configuration of a first wireless link as a beam-formed wireless link between a UE and the small cell base station. The instructions may also cause the system to transmit a beam activation response message destined for the UE. The beam activation response message may include beamforming configuration data for the UE to configure transceiver circuitry for the beam-formed wireless link with the small cell base station. The instructions may also cause the system to exchange beam training information between the UE and the small cell base station to establish the beam-formed wireless link as a first connection of a dual connection that has a second connection over a second wireless link with a macro cell base station. The UE may be capable of accessing a network via the dual connection with the macro cell base station serving as a primary cell and the small cell base station serving as a secondary cell.

According to some examples for the first at least one machine readable medium, a millimeter wave (mmWave) wireless link arranged to transmit or receive signals in a 57-64 GHz, a 20-30 GHz a 57-66 GHz, a 64-66 GHz, a 71-76 GHz, a 81-86 or a 92-95 GHz.

In some examples for the first at least one machine readable medium, the beam activation request message including UE detection data may also include location information for the UE, an identifier for the UE or UE transmission capabilities.

According to some examples for the first at least one machine readable medium, the beam activation response message may include a grant for the beam activation and small cell base station detection data that may include location information for the small cell base station, an identifier for the small cell base station or small cell base station transmission capabilities. For these examples, the beam configuration data included in the beam activation response message may include a beam identifier, power ramp information, sleep mode configuration, active mode configuration, beam resource information or code sequence information.

In some examples, the exchanged beam training information may be exchanged over the first wireless link for the establish component to establish the beam-formed wireless link.

According to some examples for the first at least one machine readable medium, the instructions may further cause the system to transmit a plurality of beam training signals to the UE over the first wireless link. The instructions may further cause the system to receive beam training feedback from the UE responsive to the UE receiving the plurality of beam training signals. For these examples, the beam-formed wireless link with the UE may be established based on beam training feedback received.

In some examples for the first at least one machine readable medium, the beam activation request message may be received via a backhaul channel between the macro and small cell base stations.

According to some examples for the first at least one machine readable medium, the beam activation request message may originate from the UE and may be received at the macro cell base station over the second wireless link. For these examples, the macro cell base station may forward the beam activation request to the small cell base station over the backhaul channel.

In some examples for the first at least one machine readable medium, the beam activation response message may be destined for the UE to be transmitted over the backhaul channel to the macro cell base station. For these examples, the beam activation response message may be capable of being forwarded to the UE by the macro cell base station over the second wireless link.

According to some examples for the first at least one machine readable medium, the beam activation request message may originate from the UE and may be received via a third wireless link coupled between the UE and the small cell base station. For these examples, the beam activation response message may be transmitted over the third wireless link.

In some examples, an example second apparatus may include a processor circuit for a UE. The second apparatus may also include a request component for execution by the processor circuit to cause a beam activation request message to be transmitted to a small cell base station over an established first wireless link with the small cell base station. The beam activation request message may initiate a second wireless link with the small cell base station. The second apparatus may also include a response component for execution by the processor circuit to receive a beam activation response message received over the first wireless link that includes beamforming configuration data to arrange transceiver circuitry to configure the second wireless link as a beam-formed wireless link. The second apparatus may also include an establish component for execution by the processor circuit to exchange beam training information with the small cell base station to establish the beam-formed wireless link as a first connection of a dual connection that has a second connection over a third wireless link with a macro cell base station. The second apparatus may also include an access component for execution by the processor circuit to access a network via the dual connection with the macro cell base station serving as a primary cell and the small cell base station serving as a secondary cell.

According to some examples for the second apparatus, the first wireless link include a mmWave wireless link arranged to transmit or receive signals in a 57-64 GHz, a 20-30 GHz a 57-66 GHz, a 64-66 GHz, a 71-76 GHz, a 81-86 or a 92-95 GHz radio frequency band.

In some examples for the second apparatus, the beam activation response message may include a grant for the beam activation and small cell base station detection data may include location information for the small cell base station, an identifier for the small cell base station or small cell base station transmission capabilities. For these examples, the beam configuration data may be included in the beam activation response message including a beam identifier, power ramp information, sleep mode configuration, active mode configuration, beam resource information or code sequence information.

According to some examples for the second apparatus, the exchanged beam training information may be exchanged over the first wireless link for the establish component to establish the beam-formed wireless link.

In some examples, the second apparatus may also include a training signal component for execution by the processor circuit to receive a plurality of beam training signals received over the first wireless link that were transmitted by the small cell base station. The second apparatus may also include a feedback component for execution by the processor circuit to cause beam training feedback responsive to receiving the plurality of beam training signal. The establish component may establish the beam-formed wireless link based on the beam training feedback received by the small cell base station.

According to some examples, the second apparatus may also include a power component for execution by the processor circuit to cause transceiver circuitry for the first wireless link to be placed in a low power mode responsive to establishment of the beam-formed wireless link with the small cell base station.

In some examples for the second apparatus, the small cell base station, the macro cell base stations and the UE may each be arranged to operate in compliance with one or more 3GPP LTE standards including LTE-A, the small and macro cell base stations configured as eNBs, having an LTE-A air or Uu interface to transmit or receive messages with the small cell eNB over the third wireless link.

According to some examples for the second apparatus, the request component may cause the beam activation request message to be transmitted and the response component to receive the beam activation response message through the LTE-A air or Uu interface.

In some examples for the second apparatus, the request component may cause the beam activation request message to be transmitted and the response component to receive the beam activation response message through the LTE-A air or Uu interface using PDCP layer formatted messages routed over a DRB.

According to some examples, the second apparatus may also include a power component for execution by the processor circuit capable of causing the LTE-A air or Uu interface to be placed in a DRX mode responsive to establishment of the beam-formed wireless link with the small cell eNB.

In some examples, the second apparatus may also include a digital display coupled to the processor circuit to present a user interface view.

In some examples, an example second at least one machine readable medium may include a plurality of instructions that in response to being executed on a system for a UE causes the system to transmit a beam activation request message to a small cell base station over an established first wireless link with the small cell base station, the beam activation request message to initiate a second wireless link with the small cell base station. The instructions may also cause the system to receive a beam activation response message over the first wireless link that includes beamforming configuration data to arrange transceiver circuitry to configure the second wireless link as a beam-formed wireless link. The instructions may also cause the system to exchange beam training information with the small cell base station to establish the beam-formed wireless link as a first connection of a dual connection that has a second connection over a third wireless link with a macro cell base station. The instructions may also cause the system to access a network over the dual connection with the macro cell base station serving as a primary cell and the small cell base station serving as a secondary cell.

According to examples for the second at least one machine readable medium, the first wireless link may include a mmWave wireless link arranged to transmit or receive signals in a 57-64 GHz, a 20-30 GHz a 57-66 GHz, a 64-66 GHz, a 71-76 GHz, a 81-86 or a 92-95 GHz radio frequency band.

In examples for the second at least one machine readable medium, the beam activation response message may include a grant for the beam activation and small cell base station detection data may include location information for the small cell base station, an identifier for the small cell base station or small cell base station transmission capabilities. For these examples, the beam configuration data included in the beam activation response message may include a beam identifier, power ramp information, sleep mode configuration, active mode configuration, beam resource information or code sequence information.

According to examples for the second at least one machine readable medium, the exchanged beam training information may be exchanged over the first wireless link for the establish component to establish the beam-formed wireless link.

In examples for the second at least one machine readable medium, the instructions may further cause the system to receive a plurality of beam training signals over the first wireless link that were transmitted by the small cell base station and cause beam training feedback responsive to receiving the plurality of beam training signals. For these examples, the beam-formed wireless link may be established based on the beam training feedback received by the small cell base station.

According to examples for the second at least one machine readable medium, the instructions to further cause the system to place transceiver circuitry for the first wireless link in a low power mode responsive to establishment of the beam-formed wireless link with the small cell base station.

In some examples, an example method may include receiving a beam activation request message that includes information to initiate configuration of a first wireless link as a beam-formed wireless link between a UE and a small cell base station. The method may also include transmitting a beam activation response message destined for the UE, the beam activation response message including beamforming configuration data for the UE to configure transceiver circuitry for the beam-formed wireless link with the small cell base station. The method may also include causing exchange of beam training information between the UE and the small cell base station to establish the beam-formed wireless link as a first connection of a dual connection that has a second connection over a second wireless link with a macro cell base station, the UE capable of accessing a network via the dual connection with the macro cell base station serving as a primary cell and the small cell base station serving as a secondary cell.

According to some examples for the method, the first wireless link may include a mmWave wireless link arranged to transmit or receive signals in a 57-64 GHz, a 20-30 GHz a 57-66 GHz, a 64-66 GHz, a 71-76 GHz, a 81-86 or a 92-95 GHz radio frequency band.

In some examples for the method, the beam activation request message may include UE detection data including location information for the UE, an identifier for the UE or UE transmission capabilities.

According to some examples for the method, the beam activation response message may include a grant for the beam activation and small cell base station detection data may include location information for the small cell base station, an identifier for the small cell base station or small cell base station transmission capabilities. For these examples, the beam configuration data included in the beam activation response message may include a beam identifier, power ramp information, sleep mode configuration, active mode configuration, beam resource information or code sequence information.

In some examples for the method, the exchanged beam training information may be exchanged over the first wireless link to establish the beam-formed wireless link. For these examples, the beam training information may include transmitting a plurality of beam training signals to the UE over the first wireless link and receiving beam training feedback from the UE responsive to the UE receiving the plurality of beam training signals. The beam-formed wireless link may be established with the UE based on received beam training feedback.

According to some examples for the method, the small cell base station may receive the beam activation request message via a backhaul channel coupled with the macro cell base station.

In some examples for the method, the beam activation request message may originate from the UE and received at the macro cell base station over the second wireless link. For these examples, the macro cell base station may forward the beam activation request to the small cell base station over the backhaul channel.

According some examples, the method may include transmitting the beam activation response message destined for the UE over the backhaul channel to macro cell base station, the beam activation response message capable of being forwarded to the UE over the second wireless link.

In some examples for the method, the small cell base station, the macro cell base stations and the UE may each be arranged to operate in compliance with one or more 3GPP LTE standards including LTE-A, the small and macro cell base stations configured as eNBs having X2 interfaces to transmit or receive messages over the backhaul channel, the UE having an LTE-A air or Uu interface to transmit or receive messages with the macro cell base station over the second wireless link.

According to some examples for the method, the UE may be capable of transmitting the beam activation request message and receiving the beam activation response message through the LTE-A air or Uu interface using RRC layer formatted messages routed over a first SRB.

In some examples for the method, the first SRB may be assigned a highest priority among a plurality of SRBs used to transmit or receive RRC layer formatted message with the macro cell eNB over the second wireless link.

In some examples for the method, the UE may be capable of transmitting the beam activation request message and receiving the beam activation response message through the LTE-A air or Uu interface using PDCP layer formatted messages routed over a DRB.

According to some examples for the method, the small cell eNB and the macro cell eNB may be capable of transmitting or receiving messages over the backhaul channel using class 1 or class 2 EPs.

In some examples for the method, the class 1 or class 2 EPs may include beam establishment information, beam maintenance information or beam termination information.

According to some examples for the method, the beam activation request message may originate from the UE and may be destined for a management entity for the network coupled to the macro cell base station. For these examples, the management entity may be capable of transmitting the beam activation response message and causing the exchange of beam training information between the UE and the small cell base station.

In some examples for the method, the management entity may cause the exchange of beam training information by forwarding a beam activation grant message to the macro cell base station to have the macro cell base station forward the beam activation grant message to the small cell base station via a backhaul channel coupled between the macro cell base station and the small cell base station. For these examples, the beam activation grant message may include information from both the beam activation request and response messages.

According to some examples for the method, the management entity, the small cell and macro cell base stations and the UE may each be arranged to operate in compliance with one or more 3GPP LTE standards including LTE-A, the management entity configured as an MME, the small and macro cell base stations configured as eNBs having X2 interfaces to transmit or receive messages over the backhaul channel, the UE having an LTE-A air or Uu interface to transmit or receive messages with the macro cell eNB over the second wireless link, the macro cell eNB having an S1-MME interface to forward messages to or from the MME.

In some examples for the method, the UE may be capable of transmitting the beam activation request message and receiving the beam activation response message through the LTE-A air or Uu interface using NAS layer formatted messages included with RRC layer formatted messages routed over a SRB established with the macro cell eNB over the second wireless link. For these examples, the macro cell eNB may be capable of forwarding the NAS layer formatted messages to the MME or to the UE.

According to some examples for the method, the beam activation request message may originate from the UE and the beam activation request may be received over a third wireless link coupled between the UE and the small cell base station. For these examples, the beam activation response message may be transmitted over the third wireless link.

In some examples for the method, the UE may be capable of placing transceiver circuitry for the third wireless link in a low power mode responsive to establishment of the beam-formed wireless link with the small cell base station.

According to some examples for the method, the small cell base station, the macro cell base stations and the UE each arranged to operate in compliance with one or more 3GPP LTE standards including LTE-A, the small and macro cell base stations configured as eNBs, the UE having an LTE-A air or Uu interface to transmit or receive messages with the small cell eNB over the third wireless link.

According to some examples for the method, the UE may be capable of transmitting the beam activation request message and receiving the beam activation response message through the LTE-A air or Uu interface using PDCP layer formatted messages routed over a DRB.

In some examples for the method, the UE may be capable of placing the LTE-A air or Uu interface in a DRX mode responsive to establishment of the beam-formed wireless link with the small cell eNB.

According to some examples, an example third apparatus may include means for performing any one of the above example methods.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   a processor circuit for a small cell base station;
   a request component for execution by the processor circuit to receive a beam activation request message from user equipment (UE) via a backhaul channel coupled with a macro cell base station, the beam activation request message including information to initiate configuration of a first wireless link as a beam-formed wireless link between UE and the small cell base station;
   a response component for execution by the processor circuit to cause a beam activation response message destined for the UE to be transmitted via the backhaul channel coupled with the macro cell base station, the beam activation response message including beamforming configuration data for the UE to configure transceiver circuitry for the beam-formed wireless link with the small cell base station; and
   an establish component for execution by the processor circuit to cause an exchange of beam training information between the UE and the small cell base station to establish the beam-formed wireless link as a first connection of a dual connection that has a second connection over a second wireless link with the macro cell base station, the UE capable of accessing a network via the dual connection with the macro cell base station serving as a primary cell and the small cell base station serving as a secondary cell.

2. The apparatus of claim 1, the first wireless link comprising a millimeter wave (mmWave) wireless link arranged to transmit or receive signals in a 57-64 gigahertz (GHz), a 20-30 GHz a 57-66 GHz, a 64-66 GHz, a 71-76 GHz, a 81-86 or a 92-95 GHz radio frequency band.

3. The apparatus of claim 1, comprising the exchanged beam training information exchanged over the first wireless link for the establish component to establish the beam-formed wireless link.

4. The apparatus of claim 3, comprising:
   a training signal component for execution by the processor circuit to cause a plurality of beam training signals to be transmitted to the UE over the first wireless link; and
   a feedback component for execution by the processor circuit to receive beam training feedback from the UE responsive to the UE receiving the plurality of beam training signals, the establish component to establish the beam-formed wireless link with the UE based on beam training feedback received by the feedback component.

5. The apparatus of claim 1, comprising the small cell base station, the macro cell base stations and the UE each arranged to operate in compliance with one or more $3^{rd}$ Generation Partnership Project (3GPP) Long Term Evolution (LTE) standards including LTE-Advanced (LTE-A), the small and macro cell base stations configured as evolved node Bs (eNBs), the small cell eNB having an LTE-A air or Uu interface for the request component to receive the beam activation request message or the response component to transmit the beam activation response message to the UE over the backhaul channel.

6. The apparatus of claim 1, comprising a digital display coupled to the processor circuit to present a user interface view.

7. A method comprising:
   receiving a beam activation request message from user equipment (UE) via a backhaul channel coupled with a macro cell base station, the beam activation request message including information to initiate configuration of a first wireless link as a beam-formed wireless link between UE and a small cell base station;
   transmitting a beam activation response message destined for the UE via the backhaul channel coupled with the macro cell base station, the beam activation response message including beamforming configuration data for the UE to configure transceiver circuitry for the beam-formed wireless link with the small cell base station; and
   causing exchange of beam training information between the UE and the small cell base station to establish the beam-formed wireless link as a first connection of a dual connection that has a second connection over a second wireless link with the macro cell base station, the UE capable of accessing a network via the dual connection with the macro cell base station serving as a primary cell and the small cell base station serving as a secondary cell.

8. The method of claim 7, the first wireless link comprising a millimeter wave (mmWave) wireless link arranged to transmit or receive signals in a 57-64 gigahertz (GHz), a 20-30 GHz a 57-66 GHz, a 64-66 GHz, a 71-76 GHz, a 81-86 or a 92-95 GHz radio frequency band.

9. The method of claim 7, comprising the beam activation request message including UE detection data including location information for the UE, an identifier for the UE or UE transmission capabilities.

10. The method of claim 7, comprising the beam activation response message including a grant for the beam activation and small cell base station detection data including location information for the small cell base station, an identifier for the small cell base station or small cell base station transmission capabilities, the beam configuration data included in the beam activation response message including a beam identifier, power ramp information, sleep mode configuration, active mode configuration, beam resource information or code sequence information.

11. The method of claim 7, comprising the exchanged beam training information exchanged over the first wireless link to establish the beam-formed wireless link, the beam training information including transmitting a plurality of beam training signals to the UE over the first wireless link and receiving beam training feedback from the UE responsive to the UE receiving the plurality of beam training signals, the beam-formed wireless link established with the UE based on received beam training feedback.

12. The method of claim 7, comprising the beam activation request message originating from the UE and received at the macro cell base station over the second wireless link, the macro cell base station to forward the beam activation request to the small cell base station over the backhaul channel.

13. The method of claim 12, comprising transmitting the beam activation response message destined for the UE over the backhaul channel to macro cell base station, the beam activation response message capable of being forwarded to the UE over the second wireless link.

14. The method of claim 12, comprising the small cell base station, the macro cell base stations and the UE each arranged to operate in compliance with one or more $3^{rd}$ Generation Partnership Project (3GPP) Long Term Evolution (LTE) standards including LTE-Advanced (LTE-A), the small and macro cell base stations configured as evolved node Bs (eNBs) having X2 interfaces to transmit or receive messages over the backhaul channel, the UE having an LTE-A air or Uu interface to transmit or receive messages with the macro cell base station over the second wireless link.

15. The method of claim 14, comprising the UE capable of transmitting the beam activation request message and receiving the beam activation response message through the LTE-A air or Uu interface using radio resource control (RRC) layer formatted messages routed over a first signal radio bearer (SRB).

16. The method of claim 15, the first SRB assigned a highest priority among a plurality of SRBs used to transmit or receive RRC layer formatted message with the macro cell eNB over the second wireless link.

17. The method of claim 14, comprising the UE capable of transmitting the beam activation request message and receiving the beam activation response message through the LTE-A air or Uu interface using packet data convergence protocol (PDCP) layer formatted messages routed over a data radio bearer (DRB).

18. The method of claim 7, comprising the beam activation request message originating from the UE and receiving the beam activation request via a third wireless link coupled between the UE and the small cell base station and transmitting the beam activation response message over the third wireless link.

19. The method of claim 18, comprising the small cell base station, the macro cell base stations and the UE each arranged to operate in compliance with one or more $3^{rd}$ Generation Partnership Project (3GPP) Long Term Evolution (LTE) standards including LTE-Advanced (LTE-A), the small and macro cell base stations configured as evolved node Bs (eNBs), the UE having an LTE-A air or Uu interface to transmit or receive messages with the small cell eNB over the third wireless link, the UE capable of transmitting the beam activation request message and receiving the beam activation response message through the LTE-A air or Uu interface using packet data convergence protocol (PDCP) layer formatted messages routed over a data radio bearer (DRB).

20. At least one non-transitory machine readable medium comprising a plurality of instructions that in response to being executed on a system for user equipment (UE) causes the system to:
  transmit a beam activation request message to a small cell base station over an established first wireless link with the small cell base station, the beam activation request message to initiate a second wireless link between the UE and the small cell base station;
  receive a beam activation response message over the first wireless link that includes beamforming configuration data to arrange transceiver circuitry to configure the second wireless link as a beam-formed wireless link;
  exchange beam training information with the small cell base station to establish the beam-formed wireless link as a first connection of a dual connection that has a second connection over a third wireless link with a macro cell base station, the exchanged beam training information exchanged over the first wireless link to establish the beam-formed wireless link; and
  access a network via the dual connection with the macro cell base station serving as a primary cell and the small cell base station serving as a secondary cell.

21. The at least one non-transitory machine readable medium of 20, the first wireless link comprising a millimeter wave (mmWave) wireless link arranged to transmit or receive signals in a 57-64 gigahertz (GHz), a 20-30 GHz a 57-66 GHz, a 64-66 GHz, a 71-76 GHz, a 81-86 or a 92-95 GHz radio frequency band.

22. The at least one machine readable medium of 20, the instructions to further cause the system to:
  receive a plurality of beam training signals over the first wireless link that were transmitted by the small cell base station; and
  cause beam training feedback responsive to receiving the plurality of beam training signals, the beam-formed wireless link established based on the beam training feedback received by the small cell base station.

23. The at least one non-transitory machine readable medium of 20, the instructions to further cause the system to place transceiver circuitry for the first wireless link in a low power mode responsive to establishment of the beam-formed wireless link with the small cell base station.

* * * * *